United States Patent [19]

Nakashima et al.

[11] Patent Number: 5,661,800
[45] Date of Patent: Aug. 26, 1997

[54] METHOD AND MANUFACTURE FOR PREVENTING UNAUTHORIZED USE BY JUDGING THE CORRESPONDING RELATIONSHIP BETWEEN LOGICAL AND PHYSICAL ADDRESSES

[75] Inventors: Kazuo Nakashima; Kazunori Naito, both of Kawasaki, Japan

[73] Assignee: Fujitsu, Limited, Kawasaki, Japan

[21] Appl. No.: 672,399

[22] Filed: Jun. 28, 1996

Related U.S. Application Data

[62] Division of Ser. No. 406,104, Mar. 17, 1995.

[30] Foreign Application Priority Data

Mar. 18, 1994 [JP] Japan .................. 6-048422

[51] Int. Cl.$^6$ .................................................. H04L 9/32
[52] U.S. Cl. .................................... 380/4; 364/286.6
[58] Field of Search ................ 380/4, 3, 5; 395/490, 395/404; 369/54, 58; 360/60; 364/286.6

[56] References Cited

U.S. PATENT DOCUMENTS

| | | | |
|---|---|---|---|
| 4,879,704 | 11/1989 | Takagi et al. | 369/14 |
| 4,975,898 | 12/1990 | Yoshida | 369/100 |
| 4,980,782 | 12/1990 | Ginkel | 360/60 |
| 5,027,396 | 6/1991 | Platteter et al. | 380/4 |
| 5,056,009 | 10/1991 | Mizuta | 395/490 |
| 5,111,444 | 5/1992 | Fukushima et al. | 369/58 |
| 5,287,408 | 2/1994 | Samson | 380/4 |
| 5,319,627 | 6/1994 | Shinno et al. | 369/54 |
| 5,379,433 | 1/1995 | Yamagishi | 395/186 |

(List continued on next page.)

FOREIGN PATENT DOCUMENTS

| | | |
|---|---|---|
| 59-72543 | 4/1984 | Japan . |
| 60-175254 | 9/1985 | Japan . |
| 61-109144 | 5/1986 | Japan . |
| 61-134836 | 6/1986 | Japan . |
| 62-150564 | 7/1987 | Japan . |
| 62-242222 | 10/1987 | Japan . |
| 62-269231 | 11/1987 | Japan . |
| 63-26855 | 2/1988 | Japan . |
| 2-78065 | 3/1990 | Japan . |
| 3-156543 | 7/1991 | Japan . |
| 6-150317 | 5/1994 | Japan . |

OTHER PUBLICATIONS

Voelcker, John and Wallich, Paul, "How disks are 'padlocked'", IEEE Spectrum, pp. 32–40 Jun. 1986.

Spesivtsev, A.V., "Software Copy Protection Systems: Structure, Analysis, Attacks", IEEE/IEE Publications Ondisc, Carnahan Conference on Security Technology, pp. 179–182.

U.S. application No. 08/216,815, Itami et al., filed Mar. 23, 1994.

Primary Examiner—Tod R. Swann
Assistant Examiner—Keith W. Saunders
Attorney, Agent, or Firm—Greer, Burns & Crain, Ltd.

[57] ABSTRACT

In case that software is written on a recording medium at physical addresses thereof in units of a prescribed size and the software is subsequently executed upon being read out of the recording medium from the physical addresses in the order of logical addresses, the corresponding relationship between the logical addresses of the software and the physical addresses conforming to the logical addresses, as well as a checking program for preventing unlawful use of the software, is added on to the main body of the software, which is then recorded on an original. Before execution of the software that has been recorded on a recording medium (the original or a copy), the corresponding relationship between the logical and physical addresses on this recording medium is obtained by the checking program. The corresponding relationship obtained and the corresponding relationship that has been added to the software are compared. If the two agree, it is deemed that the recording medium is the original and execution of the main body of the software is allowed. If the two do not agree, execution of the main body of software is not allowed.

15 Claims, 22 Drawing Sheets

U.S. PATENT DOCUMENTS

| | | | |
|---|---|---|---|
| 5,418,852 | 5/1995 | Itami et al. | 380/4 |
| 5,442,614 | 8/1995 | Tamegai | 369/58 |
| 5,513,169 | 4/1996 | Fite et al. | 369/272 |
| 5,526,335 | 6/1996 | Tamegai | 369/58 |
| 5,541,903 | 7/1996 | Funahashi et al. | 369/54 |
| 5,559,884 | 9/1996 | Davidson et al. | 380/4 |
| 5,572,589 | 11/1996 | Waters et al. | 380/4 |
| 5,586,186 | 12/1996 | Yuval et al. | 380/30 |
| 5,592,452 | 1/1997 | Yoshimoto et al. | 369/58 |
| 5,598,470 | 1/1997 | Cooper et al. | 380/4 |

FIG. 7

| 13a-41 | 13a-45 | 13a-42 | 13a-46 | 13a-43 13a-44 |
|---|---|---|---|---|
| FILE NAME | MODIFICATION TIME | EXTENSION | MODIFICATION DATE | ATTRIBUTE / RESERVED FIELD |
| RESERVED FIELD | | | CLUSTER NO. | FILE SIZE |
| 13a-44 | | | 13a-47 | 13a-48 |

FIG.8

| DIRECTORY ENTRY | | | FAT ENTRY | |
|---|---|---|---|---|
| | | 0000 | UNUSED |
| | | 0001 | UNUSED |
| 'FILE' | 0004 | 0002 | |
| | | 0003 | |
| | | 0004 | 0005 |
| | | 0005 | 0006 |
| | | 0006 | 000A |
| | | 0007 | |
| | | 0008 | |
| | | 0009 | |
| | | 000A | FFFF |

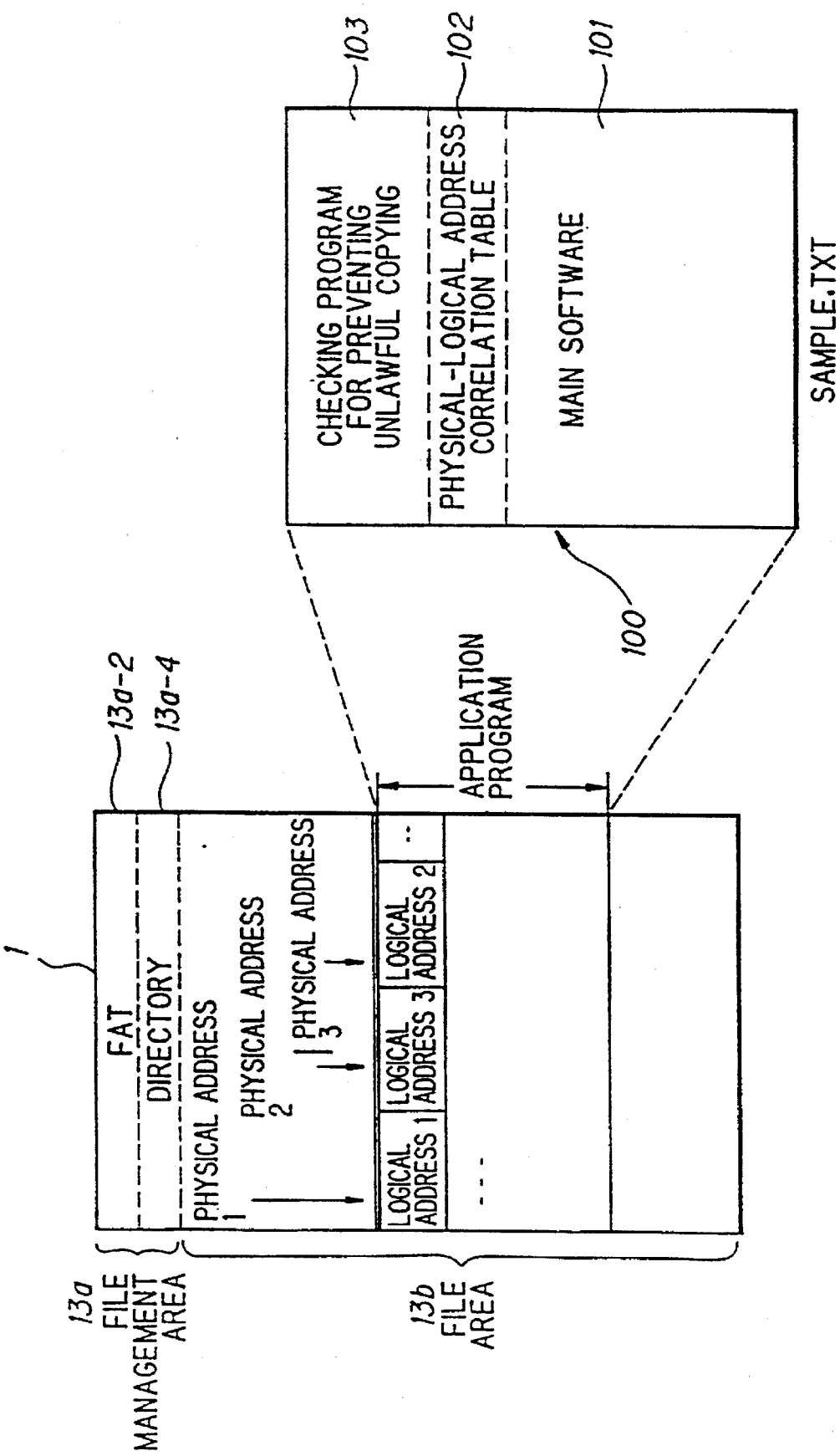

PHYSICAL-LOGICAL ADDRESS TABLE

| PHYSICAL ADDRESS (CLUSTER ADDRESS) | 1 | 2 | 3 | 4 | - - - |
|---|---|---|---|---|---|
| LOGICAL ADDRESS (CONVERTED FROM NEXT ADDRESS INFORMATION) | 1 | 2 | 3 | 4 | - - - |

ORIGINAL

COPY DISK

FIG. 15

| PHYSICAL ADDRESS | PHYSICAL ADDRESS F−1 | PHYSICAL ADDRESS G | PHYSICAL ADDRESS F+1 |
|---|---|---|---|
| LOGICAL ADDRESS | LOGICAL ADDRESS I | LOGICAL ADDRESS I+1 | LOGICAL ADDRESS I+2 |

FIG. 16A

ERROR BLOCK ADDRESS INFORMATION

| ERROR BLOCK ADDRESS | ALTERNATE BLOCK ADDRESS |
|---|---|
| 123rd TRACK, 4th SECTOR | 9990th TRACK, 0th SECTOR |

LOGICAL-PHYSICAL BLOCK ADDRESS CORRESPONDENCE TABLE

| LOGICAL BLOCK ADDRESS | PHYSICAL BLOCK ADDRESS |
|---|---|
| ⋮ | ⋮ |
| 3078 | 123rd TRACK, 2nd SECTOR |
| 3079 | 123rd TRACK, 3rd SECTOR |
| 3080 | 9990th TRACK, 0th SECTOR |
| 3081 | 123rd TRACK, 5th SECTOR |
| 3082 | 123rd TRACK, 6th SECTOR |
| ⋮ | ⋮ |

| LOGICAL BLOCK ADDRESS | PHYSICAL BLOCK ADDRESS |
|---|---|
| 3078 | 123rd TRACK, 2nd SECTOR |
| 3079 | 123rd TRACK, 3rd SECTOR |
| 3080 | 123rd TRACK, 4th SECTOR |

ORIGINAL DISK

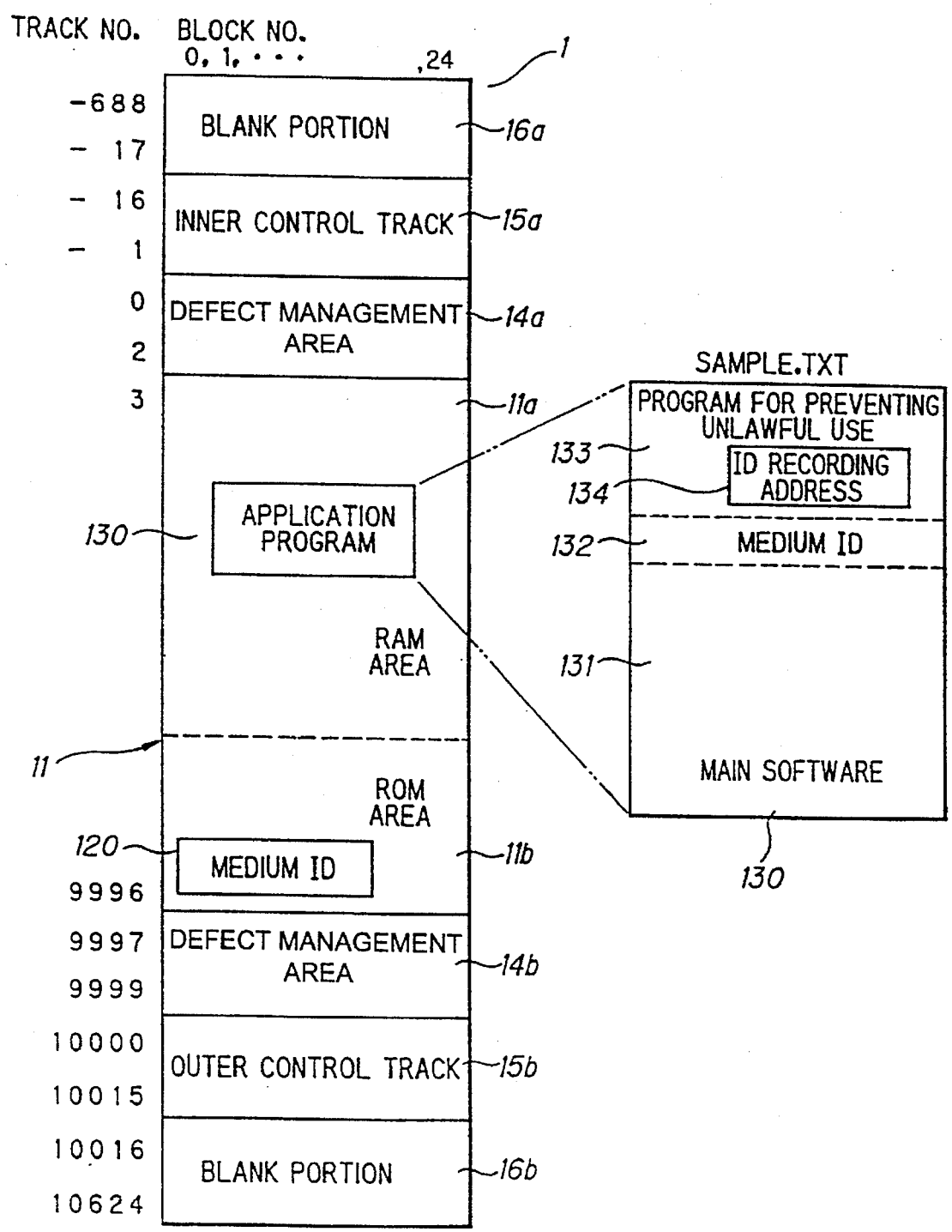

METHOD AND MANUFACTURE FOR PREVENTING UNAUTHORIZED USE BY JUDGING THE CORRESPONDING RELATIONSHIP BETWEEN LOGICAL AND PHYSICAL ADDRESSES

This is a continuation of copending application Ser. No. 08/406,104 filed on Mar. 17, 1995.

BACKGROUND OF THE INVENTION

This invention relates to a method of preventing unauthorized use, particularly a method of preventing unauthorized use of data or software such as programs stored on a recording medium such as an optical disk, a floppy disk or a magnetic disk.

The spread of large-capacity, portable recording media such as optical disks, floppy disks and magnetic disks has been accompanied by an increase applications that deal with large quantities of digital information. As a result, there has been a great increase in such digital information as data in image files and word-processor documents, games, word processing software and application programs for CAD or the like.

Information recorded on a recording medium such as an optical disk is digital information and is characterized by the fact that it can be recorded on other media without experiencing any decline in quality. Put another way, this feature of digital information means that it can be copied with ease. A problem that arises here is that confidential information as well as data and software such as application programs not purchased legally can be used upon being copied unlawfully from the original (the original recording medium). The losses sustained by software developers is immeasurable. Such unlawful copying is a violation of copyright laws and hinders the spread of such media as large-capacity, portable optical disks. Accordingly, an effective method of preventing unauthorized unlawful copying is required.

SUMMARY OF THE INVENTION

A first object of the present invention is to provide a method whereby the illegal copying of software that has been recorded on a recording medium can be prevented.

A second object of the present invention is to provide a method whereby software, even if it has been copied illegally, is prevented from being used by arranging it so that the software cannot be executed.

According to the present invention, the foregoing objects are attained by providing a method of preventing unauthorized use. The method includes the steps of providing a table, which stores a corresponding relationship between physical addresses and logical addresses of software, and a security program for preventing unauthorized unlawful use of the software, obtaining a corresponding relationship between physical addresses on a storage medium, on which the software has been stored, and logical addresses by executing the security program before the software is executed, comparing this corresponding relationship with the corresponding relationship in the table, and preventing unauthorized unlawful use of the software by disallowing execution of the software in a case where result of the comparison indicates that use of the software would be unauthorized or.

Further, according to the present invention, the foregoing objects are attained by providing a method of preventing unauthorized use. The method includes steps of adding to software a medium ID as well as a security program for preventing unauthorized use of the software. It also includes constructing a system so adapted that, in an ordinary mode, a prescribed location at which the medium ID is recorded is regarded as being a defective location and an alternate area corresponding to this defective location is accessed, while in a maintenance mode, the prescribed location is accessed. The method further includes reading data out of prescribed location upon establishing the maintenance mode by executing the security program before execution of the software, which requires comparing this data with the medium ID that has been added on to the software, and allowing execution of the software upon establishing the ordinary mode if the data and the medium ID agree and disallowing execution of the software if the data and the medium ID fail to agree.

Furthermore, according to the present invention, the foregoing objects are attained by providing a method of preventing unauthorized use including the step of recording an ID of an original at a prescribed location of a recording medium by irradiating the prescribed location with a laser beam to irreversibly deform or cause a change in the properties of the surface of the medium. The method also includes incorporating, in software, the ID, address data designating the location at which the ID has been recorded and a security program for preventing unauthorized use of the software. Further, the method requires reading data from the location, which has been designated by the address data, by executing the security program before execution of the software, and comparing the data read with the ID incorporated in the software and allowing or disallowing execution of the software based upon results of the comparison.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a diagram for describing directory structure;

FIG. 8 is a diagram for describing file management;

FIG. 9 is a diagram showing the composition of software according to a first embodiment of the invention;

FIG. 15 is a diagram for describing a correspondence table showing the correspondence between physical and logical addresses in the second embodiment;

FIGS. 16A, 16B are diagrams for describing a correspondence table showing the correspondence between logical and physical block addresses on the entirety of an optical disk;

FIG. 18 is a correspondence table showing the correspondence between physical and logical addresses on a copied disk;

FIG. 23 is a diagram for describing a fourth embodiment of the present invention.

DESCRIPTION OF THE PREFERRED EMBODIMENTS (A) Overview of the invention

Figure 1:
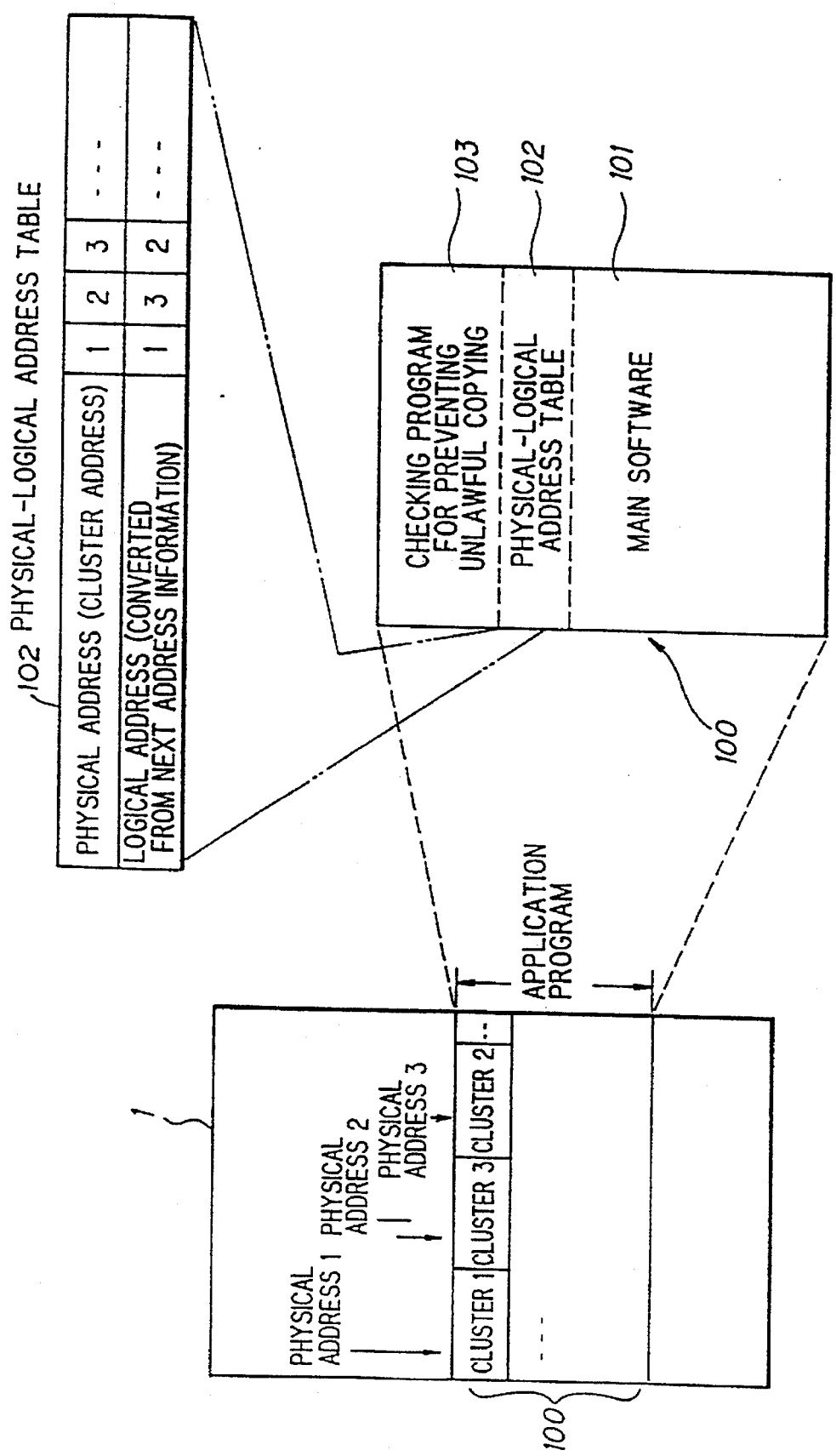
FIG. 1 is a diagram for describing the principles of the present invention (in a first aspect thereof)

FIG. 1 is a diagram for describing an overview of a first aspect of the present invention. Shown in FIG. 1 are an original recording medium (also referred to as the "original") 1 and software 100 that has been recorded on the original 1. The software 100 includes main software 101 such as an application program, and a correspondence table 102 indicating the correspondence between logical addresses and physical addresses. The latter, which are located on the original, store software data conforming to the logical addresses. The software 100 further includes a checking program 103 for preventing unlawful or unauthorized copying (unlawful use).

The software is written at physical addresses of the recording medium in units of a prescribed size and the software is executed upon being read out from the physical addresses of the recording medium in the order of the logical addresses. The corresponding relationship 102 between the logical addresses and the physical addresses at which the software data conforming to these logical addresses is stored, as well as the checking program 103 for preventing unauthorized use, is recorded on the original 1 by being added to the main software 101. Before execution of the software 100 that has been recorded on a prescribed recording medium (the original or a copy), the actual corresponding relationship between the logical addresses and the physical addresses on the recording medium at which the software data conforming to these logical addresses is stored is obtained by the checking program 103. Next, the corresponding relationship obtained and the corresponding relationship 102 that has been added to the software are compared. If the two agree, it is deemed that the recording medium is the original and execution of the main software 101 is allowed. If the two do not agree, execution of the software is not allowed. If this arrangement is adopted, the corresponding relationship between the logical addresses and physical addresses in the copy is made different from the corresponding relationship between the logical addresses and physical addresses in the original, thereby blocking execution of the copied software and making it possible to prevent unauthorized copying.

Figure 2:
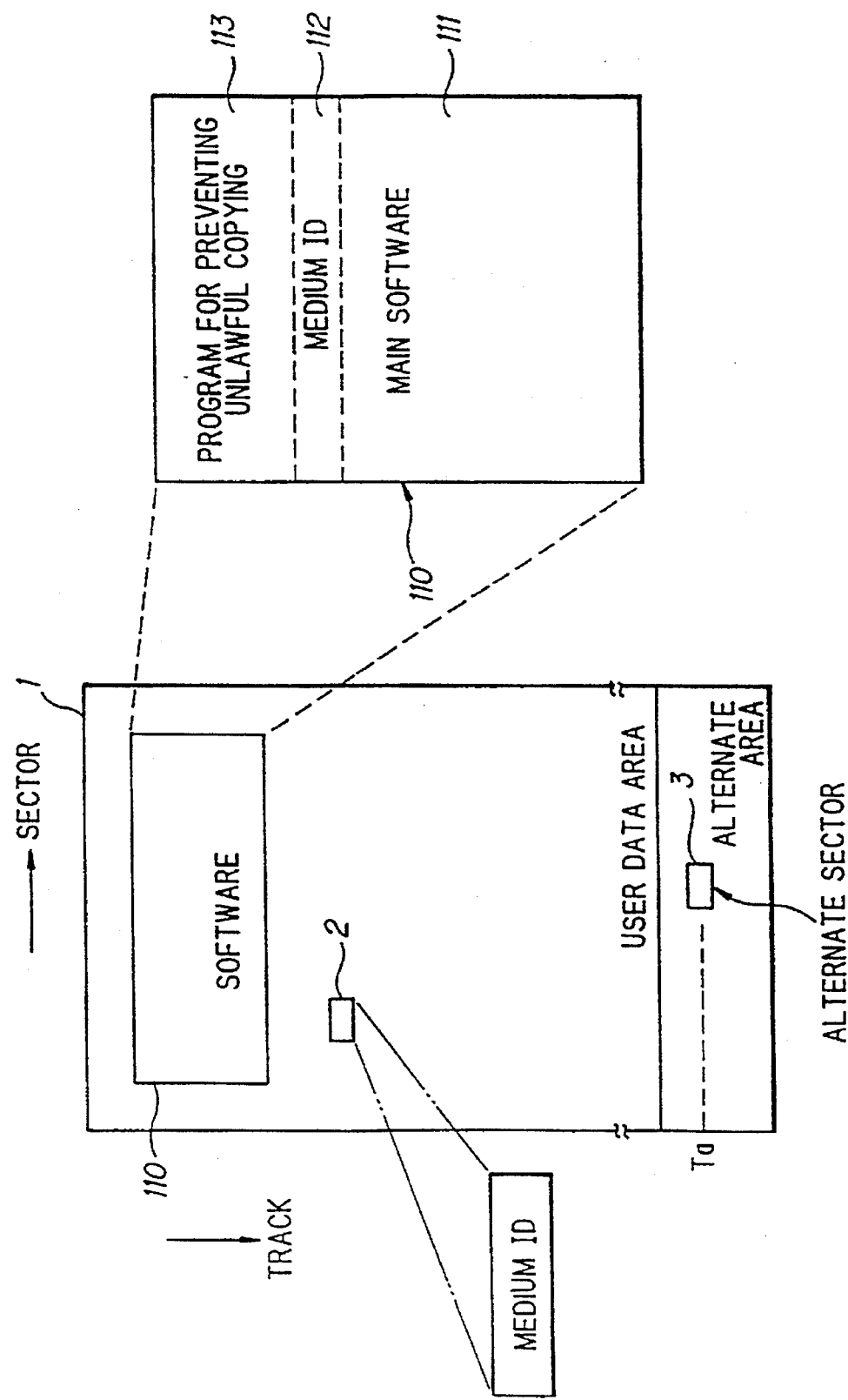
FIG. 2 is a diagram for describing the principles of the present invention (in a second aspect thereof)

FIG. 2 is diagram for describing an overview of a second aspect of the present invention. Shown in FIG. 2 are an original recording medium (the "original") 1, a normal sector 2 in which the medium ID of the original is recorded, an alternate sector 3, software 110 that has been recorded on the original, main software 111 such as an application program, the medium ID 112 of the original and a checking program 113 for preventing unlawful use.

The medium ID is recorded in the normal sector 2 of the original 1, and the ID 112 of the original and the checking program 113 for preventing unlawful or unauthorized use are recorded on the original 1 by being added to the main software 111. Control is performed in such a manner that, in an ordinary mode, the normal sector in which the medium ID has been recorded is treated as being a defective sector and the alternate sector 3 is accessed instead of the defective sector. According to control in a maintenance mode, however, the normal sector 2 is accessed rather being treated as a defective sector. When the software 110 that has been stored on a prescribed recording medium (the original or a copy) is executed, the maintenance mode is established and the data is read out of the normal sector 2 by the checking program for preventing unlawful use, and a check is performed to determine whether this data agrees with the medium ID of the original 1 added to the software. If the two agree, the recording medium is regarded as the original, the ordinary mode is established and execution of the main software 111 is allowed. If the two do not agree, then the recording medium is deemed to be a copy and execution of the software is not allowed. If this arrangement is adopted, the data that has been registered in the alternate sector 3 is recorded in the normal sector 2 of the copy when the software 110 is read from the original and copied to the copy in the ordinary mode; hence, the data read out of the normal sector of the copy differs from the medium ID of the original. As a result, execution of the copied software is blocked so that unlawful or unauthorized copying can be prevented.

(B) Embodiment (a) System configuration

Figure 3:
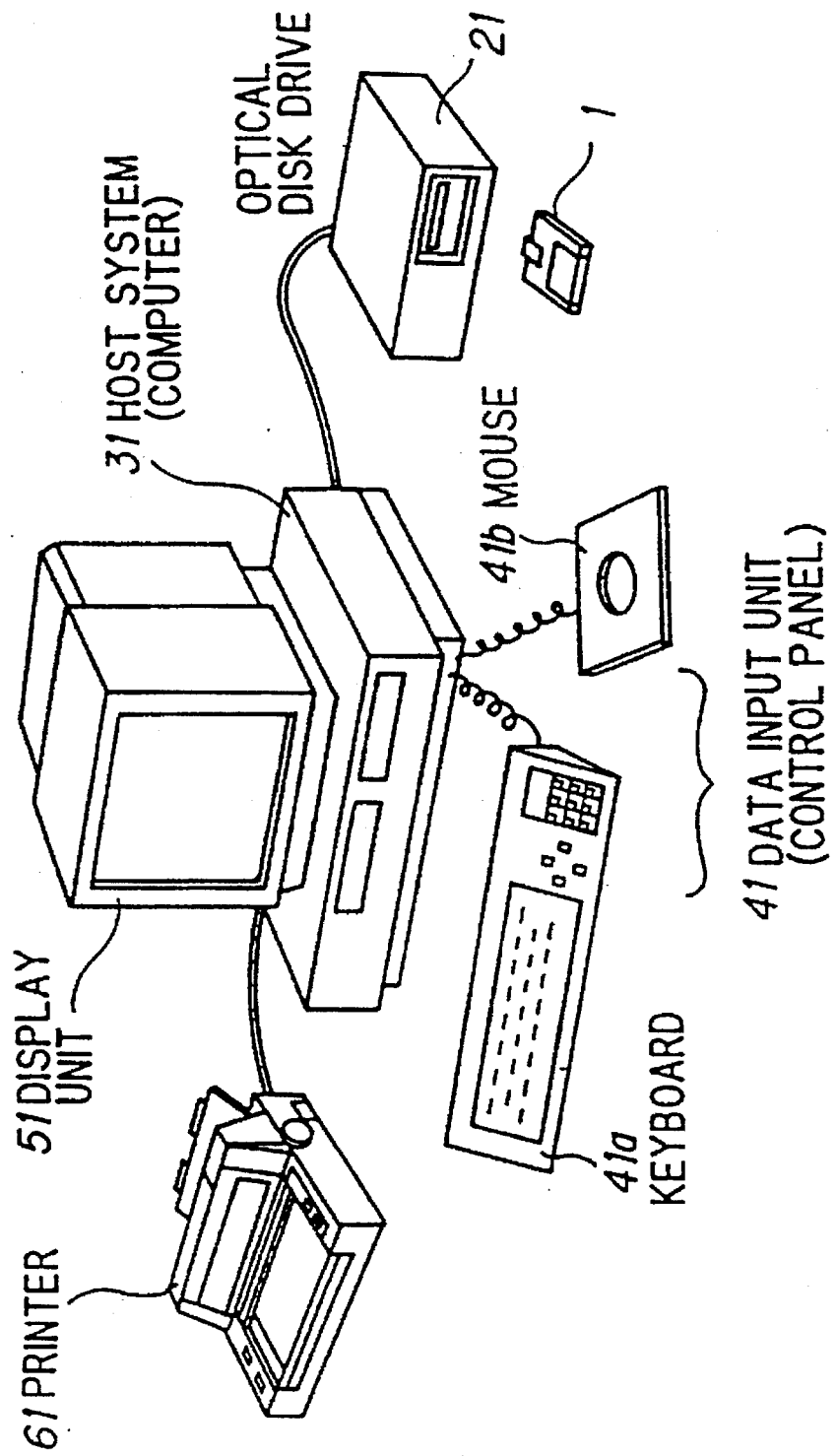
FIG. 3 is a perspective view showing the system configuration.

FIG. 3 is a diagram showing the configuration of a system in which an optical disk serves as the recording medium. The system includes an optical disk 1, an optical disk drive 21, a host system (computer) 31, a data input unit (control panel) 41 having a keyboard 41a and a mouse 41b, a display unit 51 such as a CRT or liquid-crystal display panel, and a printer 61. A hard disk and a floppy disk may be provided as required.

Figure 4:
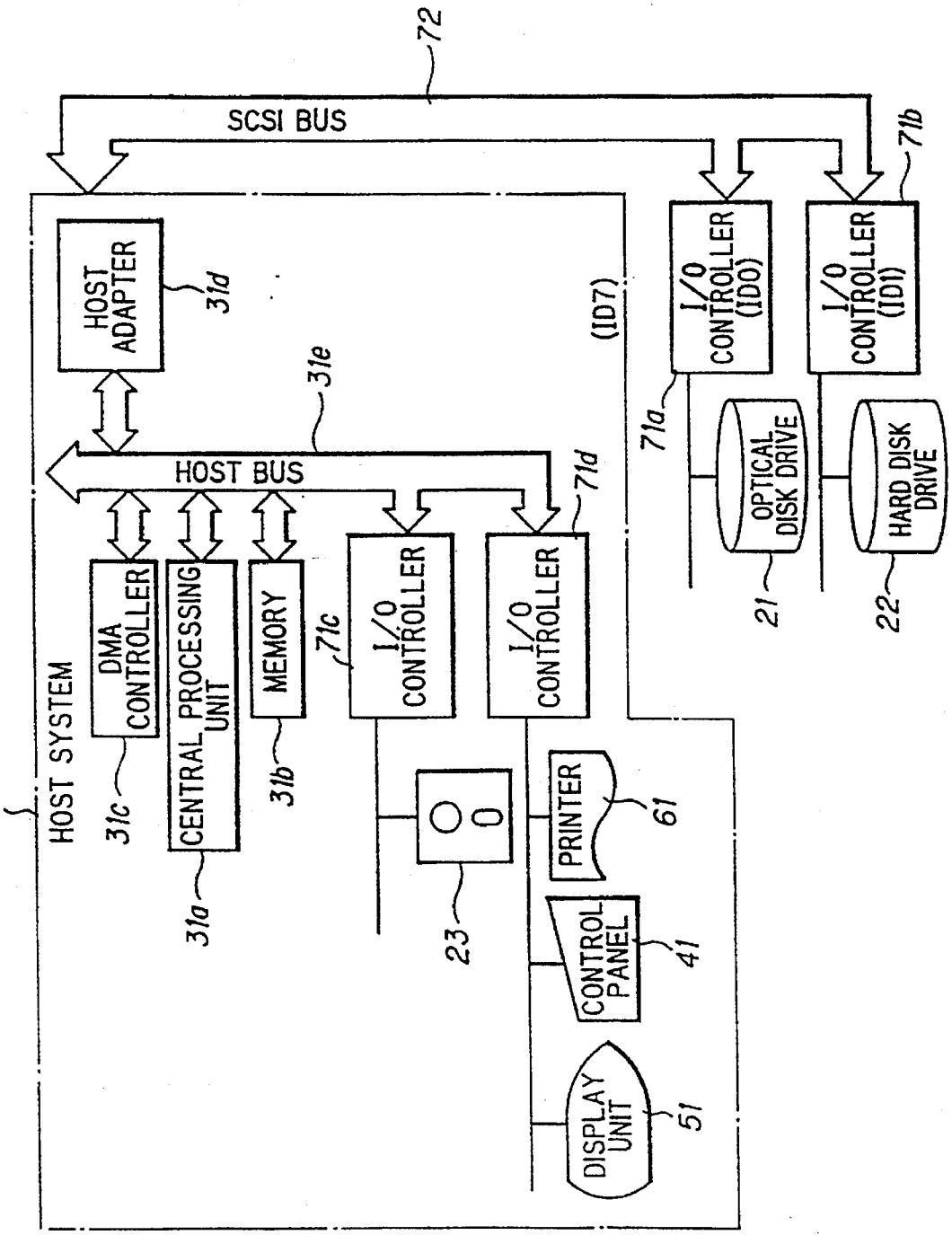
FIG. 4 is a block diagram showing the electrical construction of the system.

FIG. 4 is a block diagram showing the electrical construction of the system, in which components identical with those shown in FIG. 2 are designated by like reference characters. Shown in FIG. 4 are the optical disk drive 21, a hard disk drive 22, the host system 31, I/O controllers 71a, 71b and an SCSI (small computer system interface) bus 72. An SCSI, which is an interface for connecting a computer to an external storage device, follows the standards of the ANSI (American National Standard. Institute). By way of example, an SCSI bus is composed of a data bus, which comprises eight bits and one parity bit, and nine control buses. Such an SCSI bus is capable of having up to eight SCSI devices (a host computer, a disk device controller, etc.) connected thereto, and these devices possess respective identification numbers (referred to as "IDs" or "identifiers") 0 to 7. In FIG. 4, ID0, ID1 are assigned to the I/O controllers 71a, 71b, respectively, and ID7 is assigned to the host system 31. The one optical disk drive 21 and the one hard disk drive 22 are connected to the I/O controllers 71a, 71b, respectively, but two or more of these drives can be connected to each of these I/O controllers.

The host system 31 includes a central processing unit (processor) 31a, a memory (main memory device) 31b, a DMA controller 31c, a host adapter 31d and I/O controllers 71c, 71d, these components being connected to a host bus 31e. A floppy disk drive 23 is connected to the I/O controller 71c. The control panel 41, display unit 51 and printer 61 are connected to the I/O controller 71d.

The host system 31 and the I/O controllers 71a, 71b are interconnected via SCSI interfaces, and the I/O controllers 71a, 71b are connected to the respective drives 21, 22 by ESDI interfaces (enhanced small device interfaces). In this system the optical disk drive 21 and the hard disk drive 22 are separate from the host bus 31e, the SCSI bus 72 is provided separately of the host bus, the I/O controllers 71a, 71b for the drives are connected to this SCSI bus and the drives 21, 22 are controlled by the I/O controllers 71a, 71b, respectively. This lightens the load upon the host bus.

(b) Optical disk

Figure 5:
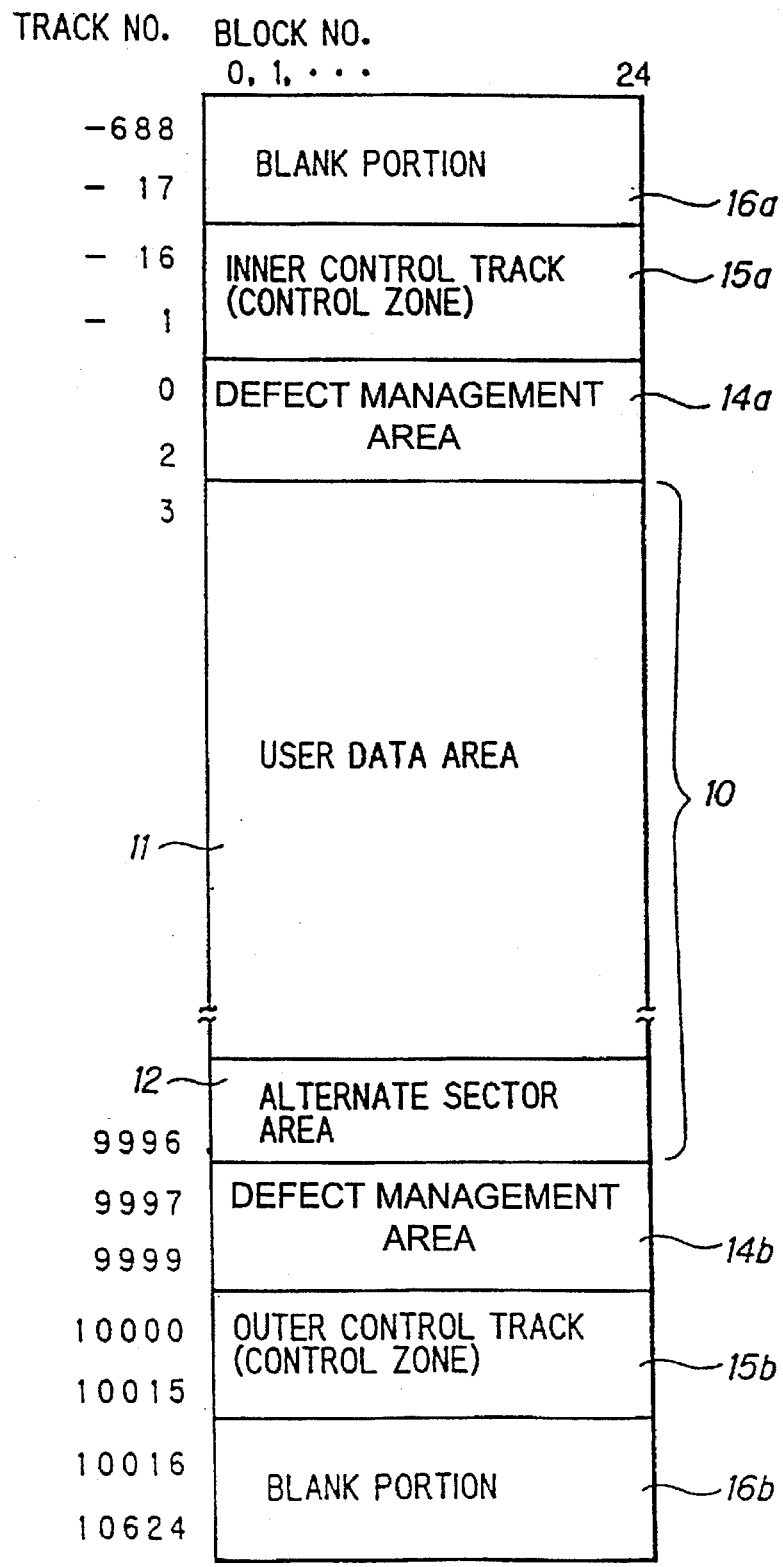
FIG. 5 is a diagram for describing the constitution of an optical disk.

FIG. 5 is a diagram for describing the constitution of an optical disk based upon international standards (ISO standards). Block numbers (0~24) are shown along the horizontal direction and track numbers along the vertical direction. Tracks from a third track to track 9996 constitute an accessible area 10, which is an area that the user can access by the usual method. The accessible area 10 is provided with a user data area 11 and an alternate sector area 12, in which data is stored rather than in a defective sector. A defect management area 14a is provided in the three tracks on the inner side of the accessible area 10, and a defect management area 14b is provided in the three tracks on the outer side of the accessible area 10. The defect management area 14a is followed on its inner side by an inner control track (control zone) 15a and then a blank area 16a, and the defect management area 14b is followed on its outer side by an outer control track (control zone) 15b and then a blank area 16b.

The defect management areas each have a disk definition sector DDS in which a primary defect list PDL and a secondary defect list SDL are stored. The PDL and SDL together store information (alternate management information) indicating the correspondence between defective sectors and alternate sectors. The PDL is recorded when the optical disk is shipped or when the disk is initialized as at the time of formatting, and the SDL is recorded in a case where a defective sector occurs owing to deterioration of the optical disk due to misuse by the user or contamination of the optical by dust. The SDL is updated whenever a defective sector is produced.

Figure 6:
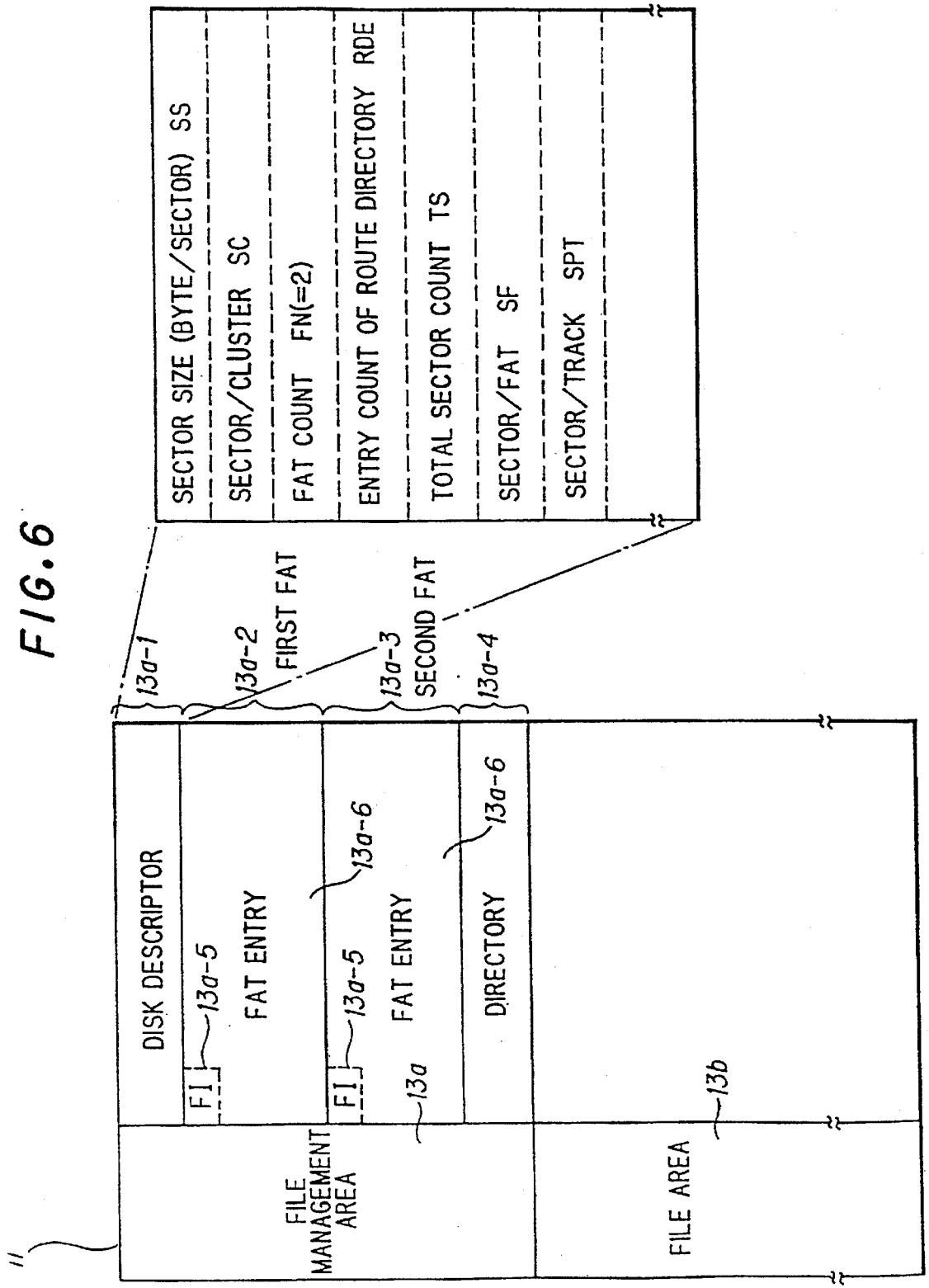
FIG. 6 is a diagram for describing a partitioned structure.

The user data area 11 can be used upon being partitioned into one or more sections. In DOS partitioning, each section is provided with a file management area 13a for storing file management information and a file area 13b for storing files, as shown in FIG. 6. Stored in the file management area 13a are a disk descriptor [a BPB (BIOS parameter block) table] 13a-1 that describes information necessary for file management within a section, redundant first and second file allocation tables (FATs) 13a-2, 13a-3, and a directory 13a-4 that designates the starting cluster number of each file. The disk descriptor 13a-1 describes the volume structure parameters of the disk, namely sector size (byte count per sector) SS, sector (block) count SC per cluster, FAT count FN (=2), entry count RDE of route directory, total sector count TS, sector count SF per FAT and sector count SPT per track.

Each of the FATs 13a-2, 13a-3 is constituted by a format identifier 13a-5 and FAT entries 13a-6. The number of FAT entries 13a-6 is equal to the number of clusters in the section. The FAT entries take on values of 0000, 0002 ~MAX, FFF7, FFFF, respectively, in which 0000 means that the cluster is not in use. Further, 0002 ~MAX mean that the cluster is in use, with the next storage location of a file being designated by the particular value. As shown in FIG. 7, each directory entry in the directory entry section 13a-4 is composed of 32 bytes and has a space 13a-41 for a file name, a space 13a-42 for a file name extension, a space 13a-43 for an attribute indication, a space 13a-44 for a reserved field, a space 13a-45 for file modification time, a space 13a-46 for a file modification date, a space 13a-47 for a starting cluster number of a file, and a space 13a-48 for file length.

FIG. 8 is a diagram for describing a directory entry and FAT entry indicating the storage location of a file name "FILE". The file "FILE" is stored at the cluster numbers $0004_H \rightarrow 0005_H \rightarrow 0006_H \rightarrow 000A_H$. The starting cluster number "0004" of the file is stored in the directory entry in correspondence with the file name "FILE". Cluster number "0005", which indicates the next storage location of the file, is stored in the FAT entry of cluster number 0004, cluster number "0006", which indicates the next storage location of the file, is stored in the FAT entry of cluster number 0005, cluster number "000A", which indicates the final storage location of the file, is stored in the FAT entry of cluster number 0006, and "FFFF", which indicates the end of the file, is stored in the FAT entry of cluster number 000A.

(c) First embodiment of method of preventing unlawful or unauthorized use according to the invention (c-1) Software constitution FIG. 9 is a diagram showing the composition of software for implementing the prevention of unlawful or unauthorized use according to a first embodiment of the invention. Illustrated in FIG. 9 are the optical disk (original) 1, the file management area 13a, the file area 13b, the FAT 13a-2 and the directory 13a-4. The application program (the program name of which shall be "SAMPLE.TXT") 100 is stored in the file area 13b and is composed of the main software 101, the correspondence table 102 indicating the correspondence between logical addresses and physical addresses, the latter being located on the original 1 and storing software data conforming to the logical addresses, and a checking program 103 for preventing unauthorized use.

Figures 10A, 10B:
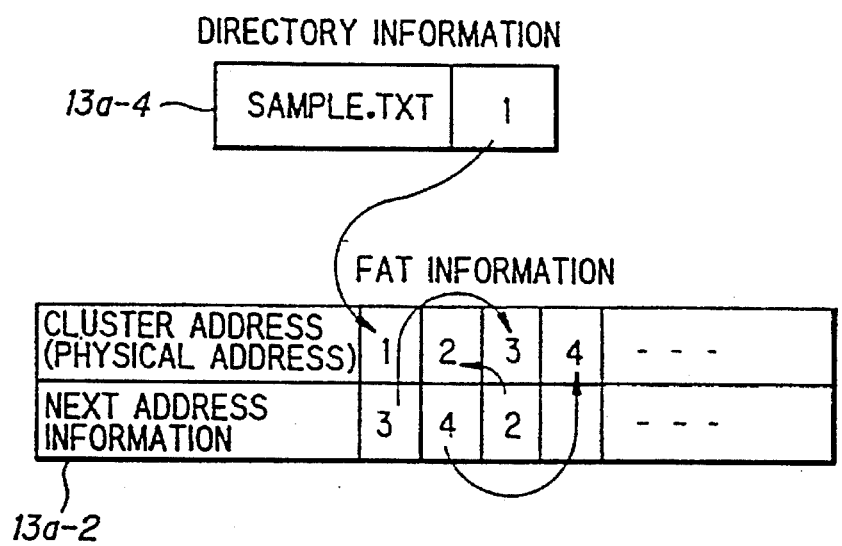
FIGS. 10A, 10B are diagrams for describing a correspondence table showing the correspondence between physical and logical addresses.

If it is assumed that the starting cluster (cluster 1) of the application program (SAMPLE.TXT) 100 is stored at cluster number 1 (physical address 1) of the original 1, the second cluster (cluster 2) at cluster number 3 (physical address 3), the third cluster (cluster 3) at cluster number 2 (physical address 2), the fourth cluster (cluster 4) at cluster number 4 (physical address 4), and so on, then directory entry information and FAT chain information shown in FIG. 10A is written in directory 13a-4 and FAT 13a-2, respectively.

The leading cluster, the second cluster, ... the n-th cluster ... where the application program (SAMPLE.TXT) 100 is written in and read out represent the logical addresses and are expressed as logical address 1 (cluster 1), logical address 2 (cluster 2), ... , logical address n (cluster n), ... , respectively. Further, the cluster number 1, cluster number 2, ... , cluster number n ... in the optical disk represent the physical addresses and are expressed as physical address 1, physical address 2, ... , physical address n, ... , respectively.

When logical and physical addresses are defined in the manner set forth above, the logical addresses stored at the physical addresses become as shown in FIG. 10B. This is the corresponding relationship between the physical addresses and logical addresses, which is incorporated in the application program (SAMPLE.TXT), as shown in FIG. 9.

It should be noted that the correspondence table 102 need not hold the correspondence between all of the physical addresses storing the software and the logical addresses. For example, it will, suffice if the table holds the correspondence between the first three of the physical and logical addresses. In order that the corresponding relationship between the physical and logical addresses in the original will not become a simple relationship, the application program is written at the physical addresses discontinuously rather than continuously in such a manner that a simple rising or falling sequence is avoided.

(c-2) Processing for preventing unlawful or unauthorized use

Figure 11:
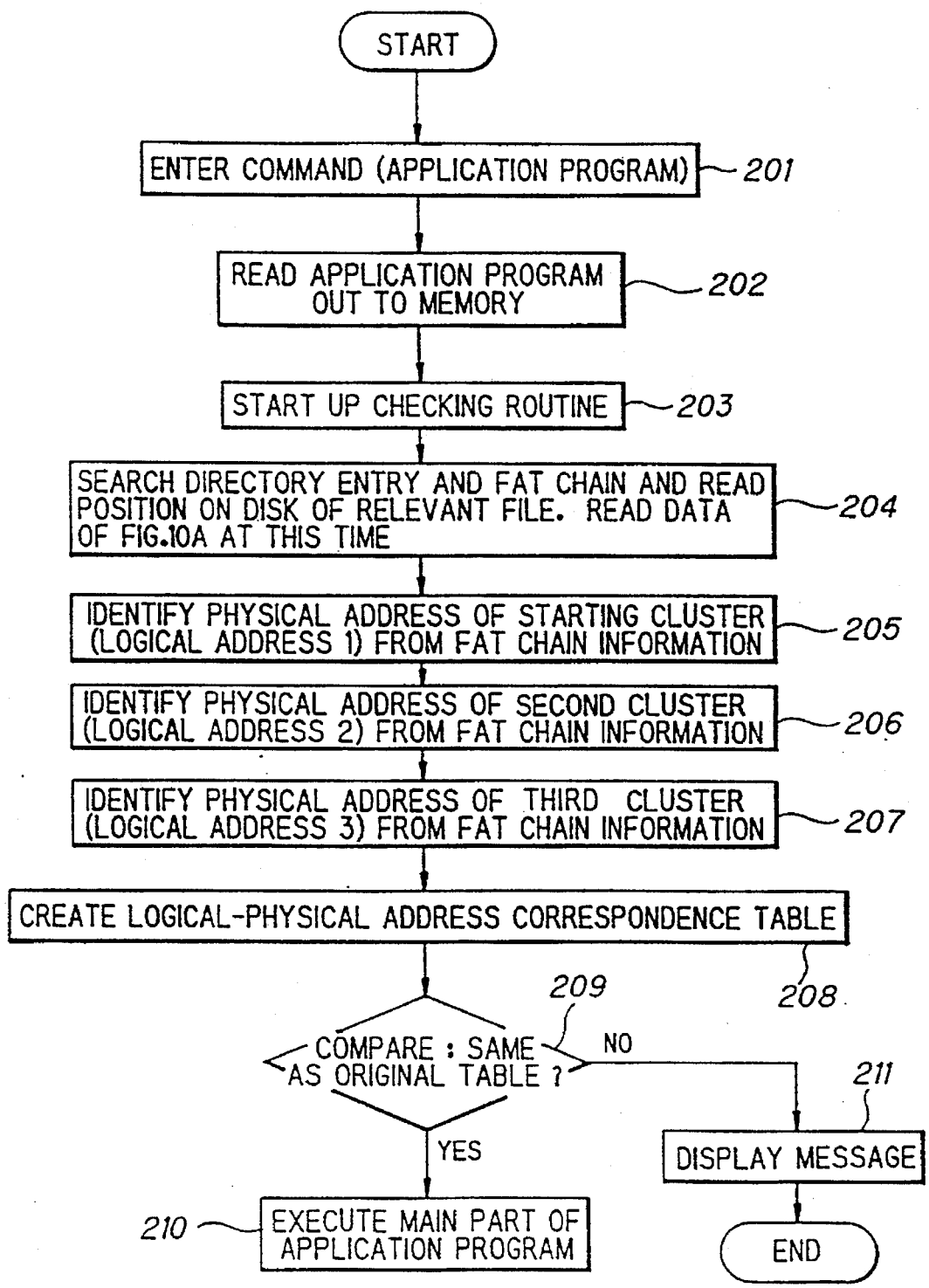
FIG. 11 is a flowchart of processing for preventing unauthorized copying.

FIG. 11 is a flowchart of processing for preventing unlawful or unauthorized use.

After the optical disk is loaded in the optical disk drive 21 (FIG. 4), "SAMPLE.TXT" is entered from the keyboard and the return key is pressed (step 201). As a result, the host system 31 acquires the application program SAMPLE.TXT in accordance with prescribed handshaking with the optical disk drive 21 and stores the program in the memory 31b (step 202).

Next, the checking program for preventing unauthorized use incorporated in the application program is started up (step 203) so that processing for preventing unauthorized use is executed. Specifically, the directory entry and FAT chain information are retrieved from the optical disk and the location of the application program SAMPLE.TXT on the optical disk is read. At this time the data shown in FIG. 10A is read (step 204).

Thereafter, the physical addresses of the starting cluster (logical address 1), the second cluster (physical address 2) and the third cluster (logical address 3) are identified from the FAT chain information (steps 205–207) and a correspondence table indicating the correspondence between the logical and physical addresses of the application program is created (step 208). When creation of the correspondence table is completed, the table is compared with the correspondence table of the original included in the application program SAMPLE.TXT (step 209).

Since the tables will agree if the optical disk is the original, from this point onward execution of the main part 101 of the application program is allowed (step 210).

On the other hand, if the created correspondence table does not agree with the correspondence table of the original included in the application program SAMPLE.TXT, this means that the optical disk 1 is a copied disk. Accordingly, a warning or other message is displayed, execution of the main software 101 is forbidden (step 211) and processing is terminated.

The reason why the correspondence table created in the case of a copied disk and the correspondence table of the original included in the application program SAMPLE.TXT fail to agree will now be described.

When the application program SAMPLE.TXT of the original is copied to a copy disk using a DOS copy command, the program is written to the copy disk in the order of the logical addresses and in the order of the physical addresses as well.

Figures 12A, 12B:
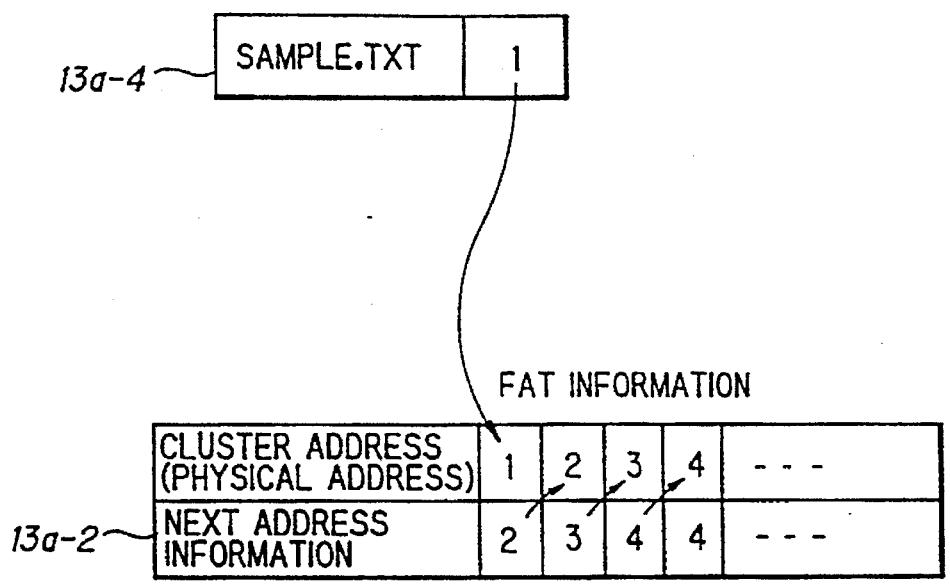
FIGS. 12A, 12B are diagrams for describing a physical-logical address table on a copied disk.

Accordingly, if it is assumed that the application program SAMPLE.TXT is copied from physical address 1 of the copy disk in regular order, the starting cluster (cluster 1) of the application program SAMPLE.TXT will be stored at physical address 1, the second cluster (cluster 2) at physical address 2, the third cluster (cluster 3) at physical address 3, the fourth cluster (cluster 4) at physical address 4, . . . , and the directory entry and FAT chain information shown in FIG. 12A will written in directory 13a-4 and FAT 13a-2, respectively. When the corresponding relationship between the physical and logical addresses is created from the directory entry and FAT chain information, the result is as shown in FIG. 12B. This differs from the physical—logical address table (FIG. 10B) of the original.

Figure 13A:
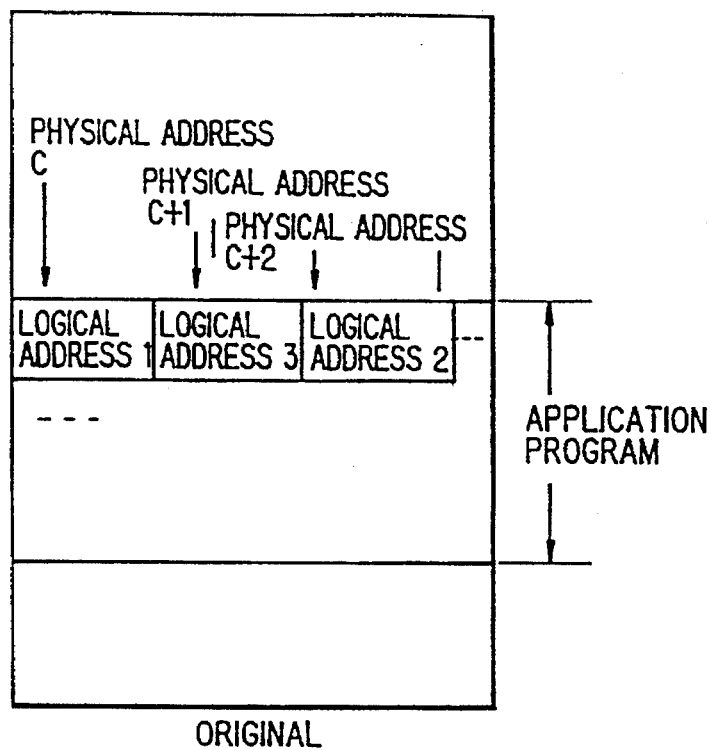
FIGS. 13A, 13B are diagrams for describing a physical-logical address table on an ordinary original and on a copy disk.
Figure 13B:
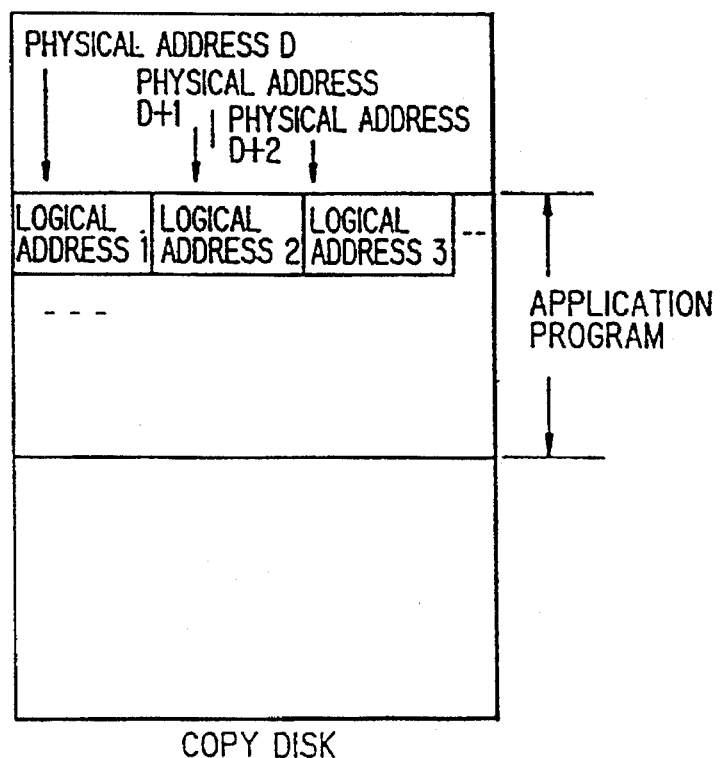

When an original in FIG. 13A is copied to a copy disk, generally the result is as shown in FIG. 13B. As a result, when the correspondence between the physical and logical addresses of the original is as follows:

| PHYSICAL ADDRESS C | PHYSICAL ADDRESS (C + 1) | PHYSICAL ADDRESS (C + 2) |
| --- | --- | --- |
| LOGICAL ADDRESS 1 | LOGICAL ADDRESS 3 | LOGICAL ADDRESS 2 | the correspondence between the physical and logical addresses of the copy disk is as follows:

| PHYSICAL ADDRESS D | PHYSICAL ADDRESS (D + 1) | PHYSICAL ADDRESS (D + 2) |
| --- | --- | --- |
| LOGICAL ADDRESS 1 | LOGICAL ADDRESS 2 | LOGICAL ADDRESS 3 |

Thus, the physical—logical address tables of the original and copy disk differ in that (1) the physical addresses change from C to D and (2) the relationship between the physical addresses and logical addresses is different. Hence, execution of the software on the copy disk is inhibited to prevent unlawful or unauthorized copying.

(d) Second embodiment of method of preventing unlawful unauthorized copying according to the invention In the first embodiment, the corresponding relationship between physical and logical addresses is incorporated in an application program (software) in cluster units. This is because accessing is performed in cluster units according to the DOS command. With an SCSI copy command, however, data can be read out of an original and recorded on a copy disk in block (sector) units. In such case the user data area of an optical disk is the same for both the original and copy disk and use based upon an unlawful copy cab no longer be prevented as in the first embodiment.

In the second embodiment, therefore, the corresponding relationship between physical and logical addresses is incorporated in the application program (software) in sector units and it is so arranged that the corresponding relationship of the original will differ from that of the copy disk.

(d-1) Software constitution

Figure 14:
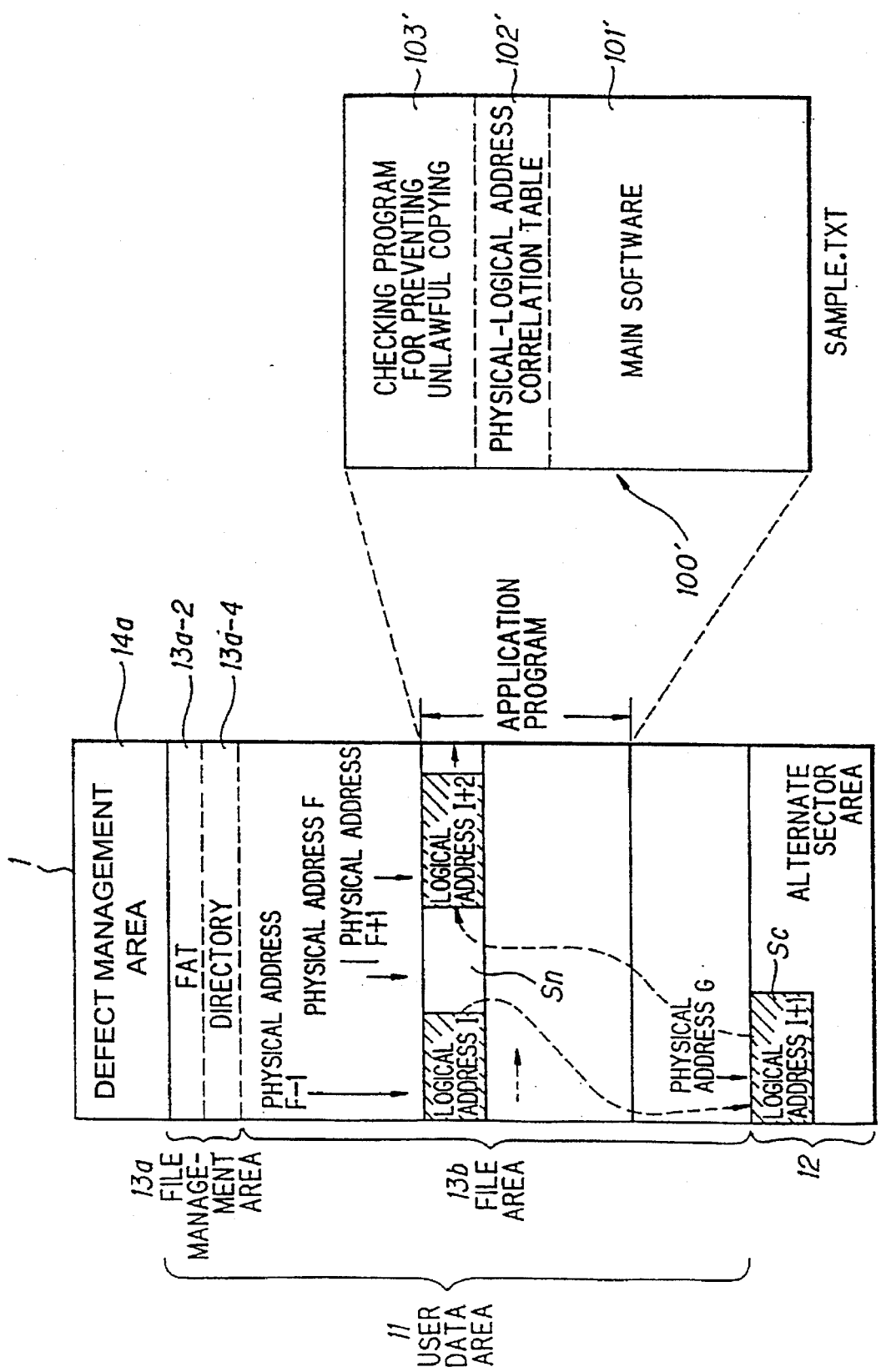
FIG. 14 is a diagram showing the composition of software according to a second embodiment of the invention.

FIG. 14 is a diagram showing the composition of software according to the second embodiment. Illustrated in FIG. 14 are the optical disk (original) 1, the alternate sector area 12, the file management area 13a, the file area 13b, the FAT 13a-2, the directory 13a-4 and the defect management area 14a. Though Sn is a normal sector, here it is regarded as being a defective sector, data to be recorded in the sector Sn is recorded in the alternate sector Sc and the corresponding relationship between the defective sector (actually the normal sector) Sn and the alternate sector Sc is recorded in the defect management area 14a.

Numeral 100' denotes an application program (let SAMPLE.TXT be the name of the program) that has been recorded in the file area 13b. The application program 100' is composed of main software 101', a correspondence table 102' showing the correspondence between physical and logical addresses on the original, and a checking program 103' for preventing unauthorized use. The application program 100' is written in the file area, which includes the defective sector (actually the normal sector) Sn, sequentially in the manner indicated by the arrows attached to the dashed lines. Some of the software to be recorded in the defective sector (actually the normal sector) Sn is recorded in the alternate sector Sc.

A sector (block) can be expressed by the track number and the sector position [written in the form "(i-th track, j-th sector)"] at this track number. A (0th track, 0th sector) is adopted as the starting sector (first sector), the sectors that follow this sector are numbered consecutively and the sectors can be expressed by these numbers. The former are defined as physical addresses and the latter as logical addresses.

When the physical and logical addresses are defined as set forth above, the correspondence between the physical addresses storing the application program and the logical addresses becomes as illustrated in FIG. 15 if the application program has been recorded from physical address (F-1) as in FIG. 14. This correspondence becomes the correspondence table 102' indicating the corresponding between the physical and logical addresses. The table 102' is incorporated in the application program (SAMPLE.TXT) 100'. It should be noted that the correspondence table 102' need not hold the correspondence between all of the physical addresses at which the application program is recorded and the logical addresses. For example, it will suffice if the table holds the correspondence between the first three of the physical and logical addresses that include the defective sector.

(D-2) Correspondence between physical and logical addresses on entire optical disk FIGS. 16A, 16B are diagrams for describing correspondence between physical and logical addresses on the entirety of an optical disk. Numeral 14a denotes the defect management area. It is assumed that block addresses of the defective sector and alternate sector have been written in the defect management area as illustrated in FIG. 16A. If it is assumed that one track has been partitioned into 25 sectors between the physical address (i-th track, j-th sector) of the normal sector and logical address A, the corresponding relationship indicated by the following equation will hold:

A=25·i+j+1

However, the above equal will not hold with regard to a defective sector. The sector having the physical block address (123rd track, 4th sector) from the defect management area is the defective sector. Consequently, the physical address of the defective sector cannot be made to correspond to the logical block address 3080. Rather, the physical block address (9990th track, 0th sector) of the alternate sector corresponds to this logical block address, with the result that the correspondence table indicating the correspondence between the logical and physical block addresses becomes as shown in FIG. 16B.

There is only one defective sector in the case described above. However, a correspondence table indicating the correspondence between the logical and physical block addresses of the entire optical disk is created in the same manner even if there are a plurality of defective sectors.

Figure 17:
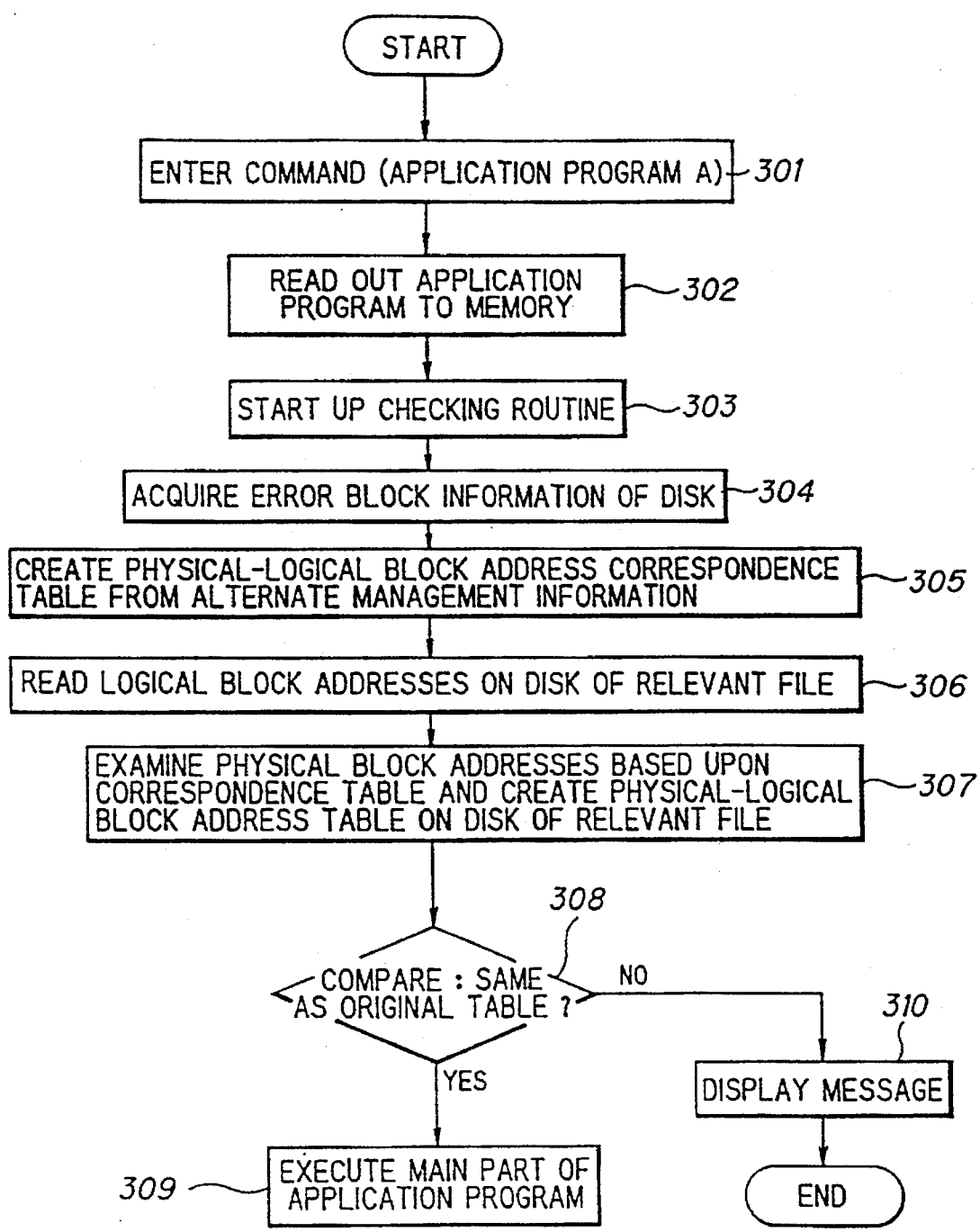
FIG. 17 is a flowchart of processing for preventing unauthorized copying according to a second aspect of the invention.

(d-3) Control for preventing unlawful or unauthorized use in second aspect of the invention FIG. 17 is a flowchart of processing for preventing unlawful or unauthorized use according to a second aspect of the invention. It should be noted that the logical address 3080 (physical address: 123rd track, 4th sector) in the original is a normal sector but is regarded as being a defective sector, and the block addresses of the defective sector and alternate sector are recorded in the defect management area 14a in advance, as shown in FIG. 16A. Further, the application program SAMPLE.TXT is recorded at logical addresses 3078–3082. In this case, the portion of the software recorded at the logical address 3080 is not recorded at the physical address (123rd track, 4th sector) but in the alternate sector (9990th track, 0th sector) instead. Accordingly, the correspondence between the physical and logical addresses of the first three sectors of the application program SAMPLE.TXT is as indicated in the section enclosed by the dashed lines in FIG. 16B. This correspondence is incorporated in the application program 100' as the correspondence table 102' indicating the correspondence between the physical and logical addresses.

After the optical disk is loaded in the optical disk drive 21 (FIG. 4), "SAMPLE.TXT" is entered from the keyboard and the return key is pressed (step 301). As a result, the host system 31 acquires the application program SAMPLE.TXT in accordance with prescribed handshaking with the optical disk drive 21 and stores the program in the memory 31b (step 302).

Next, the checking program 103' for preventing unauthorized use of the application program SAMPLE.TXT is started up (step 303) so that processing for preventing unauthorized use is executed. Specifically, alternate management information (see FIG. 16A) indicating the correspondence between the defective sector and alternate sector is acquired from the defect management area of the optical disk and stored in the memory 31b (step 304).

Next, the correspondence table indicating the correspondence between the logical and physical addresses of the entire disk is created using the alternate management information (step 305). Thereafter, the logical addresses of the application program SAMPLE.TXT on the disk are obtained from the information that has been stored in the file management area of the disk (step 306). For example, if the disk is managed in accordance with MS-DOS, the logical address of each file will be clear from the directory entry, the sector count SC of sectors constituting the cluster and the FAT information. Accordingly, this file management information is read and the logical addresses of the application program SAMPLE.TXT on the disk are obtained.

Next, the physical addresses corresponding to the first three logical addresses of the application program are found using the correspondence table obtained at step 305, and a correspondence table indicating the correspondence between the physical and logical addresses is created (step 307).

When the correspondence table indicating the correspondence between the physical and logical addresses has been created, this table is compared with the correspondence table of the original included in the application program SAMPLE.TXT (step 308).

If the optical disk is the original, the two tables will agree and therefore execution of the main part 101' of the application program is allowed from this point onward (step 309).

On the other hand, if the created correspondence table does not agree with the correspondence table of the original included in the application program SAMPLE.TXT, this means that the optical disk is a copied disk. Accordingly, a warning or other message is displayed, execution of the main software 101' is forbidden (step 310) and processing is terminated.

The reason why the correspondence table created in the case of a copied disk and the correspondence table of the original included in the application program SAMPLE.TXT fail to agree will now be described.

When the application program SAMPLE.TXT of the original is copied to a copy disk in sector (block) units using an SCSI copy command, the program is written to the copy disk in the order of the logical addresses. Accordingly, if it is assumed that the application program SAMPLE.TXT is copied from logical address 3078 of the copy disk, then (1) the starting sector is recorded at logical address 3078 (physical address: 123rd track, 2nd sector);

(2) the second sector is recorded at logical address 3079 (physical address: 123rd track, 3rd sector);

(3) the third sector is recorded at logical address 3080 (physical address: 123rd track, 4th sector);

(4) the fourth sector is recorded at logical address 3081 (physical address: 123rd track, 5th sector); and (5) the fifth sector is recorded at logical address 3082 (physical address: 123rd track, 6th sector).

Consequently, the correspondence table indicating the correspondence between the physical and logical addresses created from the copy disk becomes as shown in FIG. 18; this differs from the correspondence table of the original. It should be noted that the logical address 3080 (physical address: 123rd track, 4th sector) is taken to be a normal sector on the copy disk. However, even if this is a defective sector, there is no possibility that an alternate sector the same as that of the original will be assigned, and therefore the correspondence tables will differ. In the foregoing, it is described for the sake of convenience that the application program is recorded on the copy disk from a logical address identical with that of the original. However, the probability of this occurring is very low.

Figure 19A:
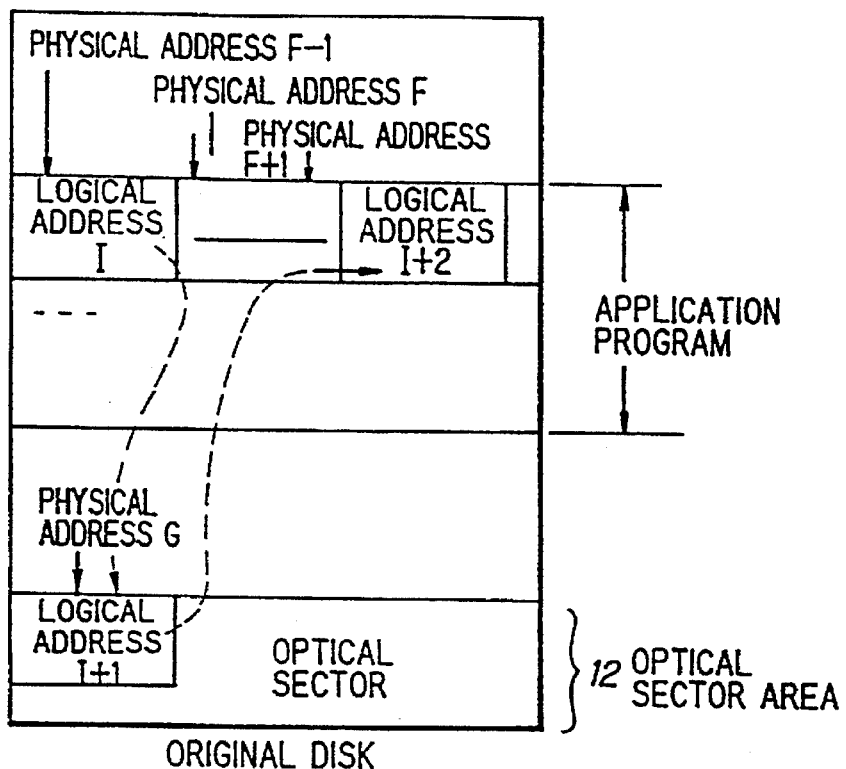
FIGS. 19A, 19B are diagrams for describing a correspondence table showing the correspondence between physical and logical addresses table on an ordinary original and on a copy disk.
Figure 19B:
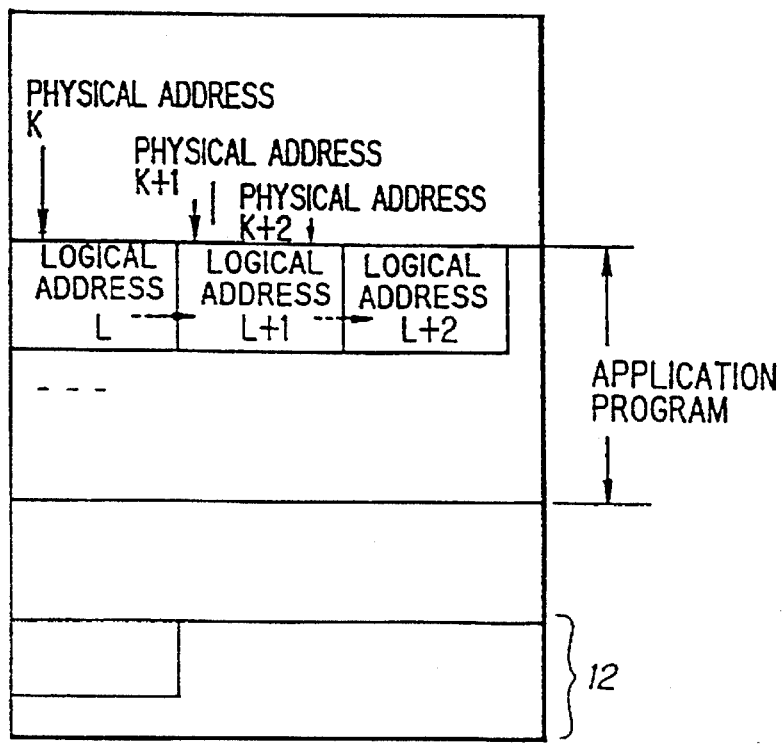

When an original in FIG. 19A is copied to a copy disk, generally the result is as shown in FIG. 19B. As a result, the correspondence between the physical and logical addresses of the original is as follows:

| PHYSICAL ADDRESS (F − 1) | PHYSICAL ADDRESS G | PHYSICAL ADDRESS (F + 1) |
|---|---|---|
| LOGICAL ADDRESS I | LOGICAL ADDRESS (I + 1) | LOGICAL ADDRESS (I + 2) |

However, the correspondence between the physical and logical addresses of the copy disk is as follows:

| PHYSICAL ADDRESS K | PHYSICAL ADDRESS (K + 1) | PHYSICAL ADDRESS (K + 2) |
|---|---|---|
| LOGICAL ADDRESS L | LOGICAL ADDRESS (L + 1) | LOGICAL ADDRESS (L + 2) |

Thus, the physical—logical address tables of the original and copy disk differ in that (1) the physical addresses are different and (2) the relationship between the physical addresses and logical addresses is different. Hence, execution of the software on the copy disk is inhibited to prevent unauthorized-copying.

(e) Third embodiment of method of preventing unauthorized use according to the invention In the first and second embodiments, the original and copy disk are distinguished between based upon corresponding relationship between logical and physical addresses. In the third embodiment, the original and copy disk are distinguished between using a medium ID.

(e-1) Constitution of optical disk and software

Figure 20:
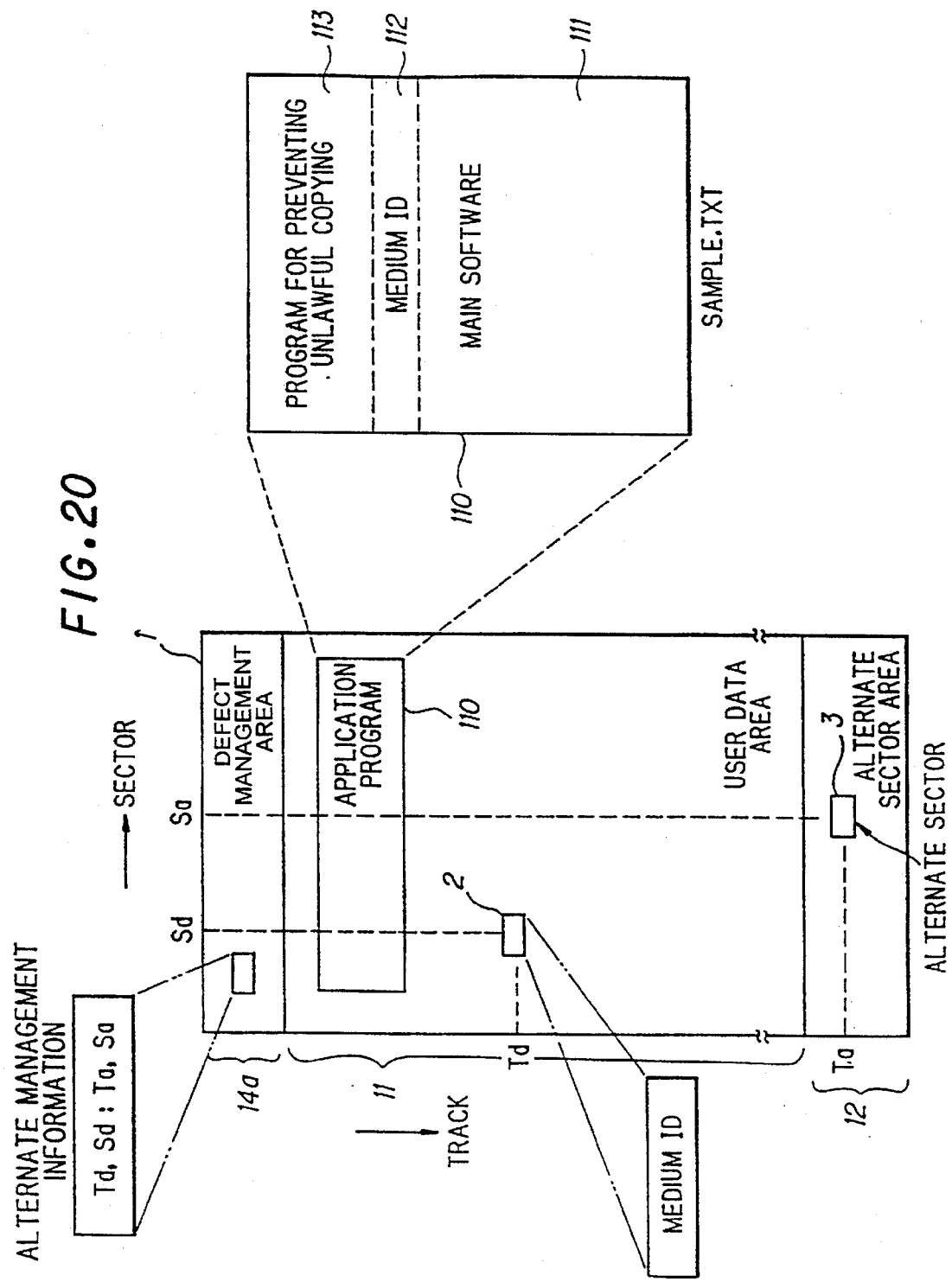
FIG. 20 is a diagram for describing a third embodiment of the present invention.

FIG. 20 is a diagram for describing a third embodiment of the present invention.

Illustrated in FIG. 20 are the optical disk (original) 1, the user data area 11, the alternate sector area 12 and the defect management area 14a. Numeral 2 denotes the sector in which the medium ID is recorded. This sector is regarded as being a normal sector in the maintenance mode and a defective sector in the ordinary mode. Numeral 3 denotes the alternate sector accessed instead of the sector 2 in the ordinary mode. The corresponding relationship between the defective sector (actually the normal sector) 2 and the alternate sector 3 is recorded in the defect management area 14a. More specifically, the correspondence (alternate management information) between the track number Td and sector number Sd of the defective sector 2 and the track number Ta and sector number Sa of the alternate sector 3 is recorded in the defect management area 14a.

The application program (whose program name is SAMPLE.TXT) 110 is composed of the main software 111, the ID 112 of the original and the checking program 113 for preventing unauthorized use.

(e-2) Control for preventing unlawful use in third embodiment of the invention

Figure 21:
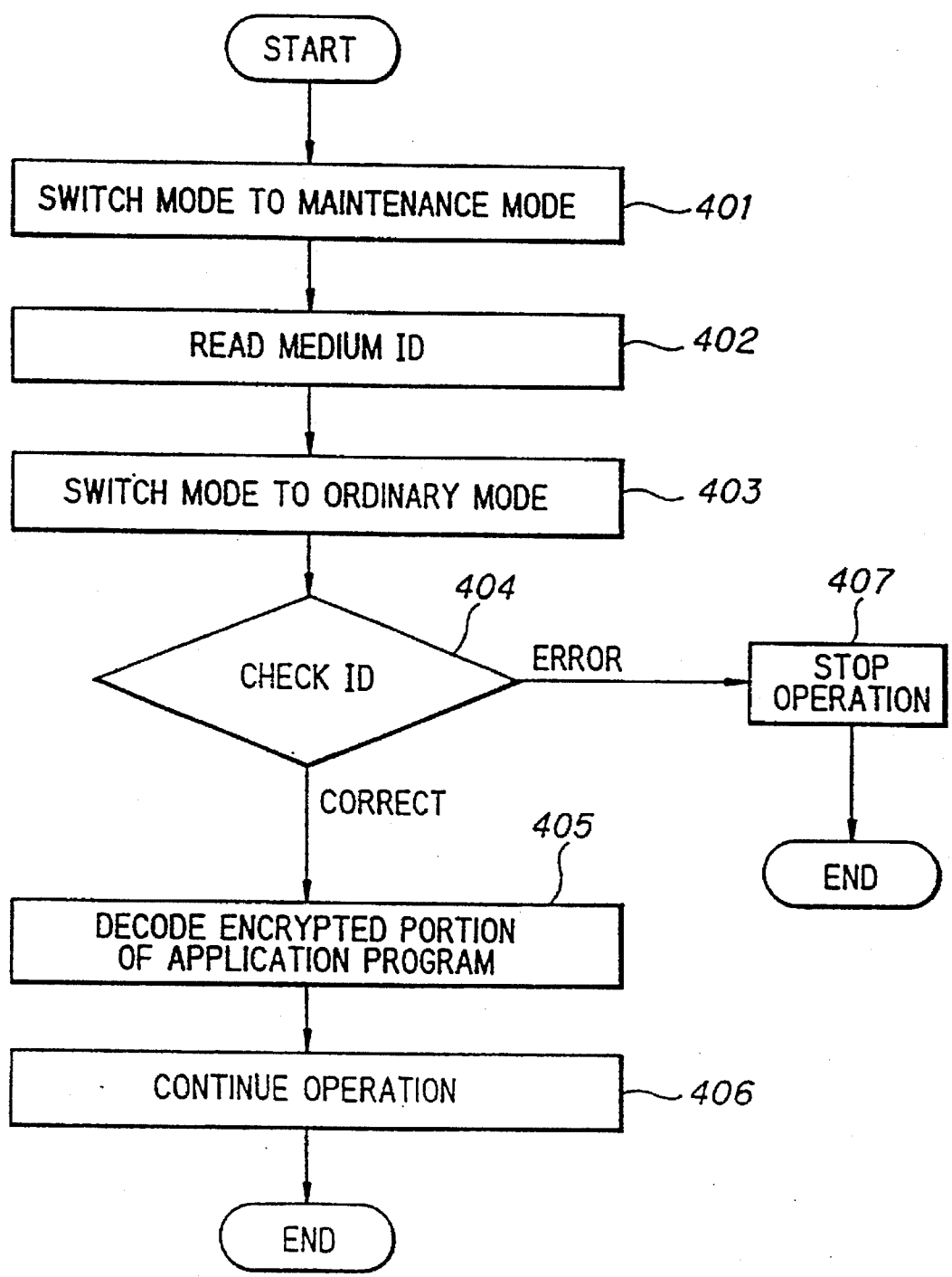
FIG. 21 is a flowchart of processing for preventing unauthorized copying according to a third embodiment of the present invention.

FIG. 21 is a flowchart of processing for preventing unlawful use in the third embodiment of the invention. It should be noted that the medium ID is recorded in the sector 2 at a prescribed physical address of the Original 1, and that the ID 112 of the original and the checking program 113 for preventing unlawful use are recorded on the original 1 by being added to the application program SAMPLE.TXT. Further, the main software is assumed to have been encrypted.

After the optical disk is loaded in the optical disk drive 21 (FIG. 4), "SAMPLE.TXT" is entered from the keyboard and the return key is pressed. As a result, the host system 31 acquires the application program SAMPLE.TXT in accordance with prescribed handshaking with the optical disk drive 21 and stores the program in the memory 31b. Next, the checking program 113 for preventing unauthorized use is started up so that processing for preventing unauthorized use is executed.

First, the mode is changed over to establish the maintenance mode (step 401). The maintenance mode is a mode in which the normal sector 2 is treated as being a normal sector rather than a defective sector. In other words, this is a mode in which no reference is made to the alternate management information that has been stored in the defect management area 14a.

Next, data (the medium ID in the case of the original and simple data in the case of the copy disk) is read from the predetermined sector 2 (step 402) and the mode is changed over to the ordinary mode (step 403). This is a mode in which the normal sector is treated as being a defective sector. In other words, the ordinary mode is one in which the alternate management information that has been stored in the defect management area 14a is referred to as being effective.

Next, a check is performed to determine whether the read data agrees with the medium ID of the original 1 included in the application program SAMPLE.TXT (step 404). If they agree, this means the optical disk that has been loaded in the optical disk drive is the original. Accordingly, the encrypted application program is decoded (step 405) and execution of the main software 111 is performed in the ordinary mode on the basis of the decoded program (step 406).

On the other hand, if the read data does not agree with the medium ID of the original 1, this means that the optical disk I is a copied disk. Accordingly, a warning or other message is displayed and operation is halted (step 407). The foregoing is a case in which the main software 111 has been encrypted. However, encryption can be dispensed with and step 405 can therefore be deleted.

In the case of the copied disk, the data read from the sector 2 is not the medium ID for the following reason. In the ordinary mode, copying is carried out by reading the application program SAMPLE.TXT 110 from the original 1 and recording it on the copy disk. However, in the ordinary mode, sector 2 in which the medium ID has been recorded is regarded as being a defective sector and therefore the alternate sector 3 is processed instead of the sector 2 and the data in the alternate sector 3 is written in the sector 2 of the copy disk. Consequently, the data read out of the prescribed physical address (sector 2) of the copy disk differs from the medium ID of the original, execution of the copied software can be inhibited and unauthorized use thereof can be prevented. Unlawful or unauthorized use of the software is prevented, if random data is written in the alternate sector 3.

Further, even if copying is carried out in sector units in response to an SCSI copy command, duplication does not extend as far as the alternate management information recorded in the defect management area or up to the contents of the defective sector. This makes it possible to prevent the use based upon unlawful or unauthorized copying.

In the embodiment set forth above, a case is described in which the invention is applied to an optical disk. However, the invention is not limited to optical disks but can of course be applied to other recording media such as hard disks and floppy disks.

(f) Fourth embodiment of method of preventing unlawful or unauthorized use according to the invention (f-1) Overview In order to prevent copying using a medium ID, it is so arranged that a user absolutely cannot rewrite a medium ID recorded on an optical disk. If such an arrangement is adopted, the medium ID of the original and the medium ID of another optical disk will differ. Even if software is copied to another optical disk, therefore, execution of this software can be refused.

In order to make it impossible to rewrite a medium ID, it is necessary to record the ID in a physically irreversible manner. To accomplish this, first an absolute location (sector) is prepared on the optical disk and the medium ID is recorded at this location. The recording method used is not of the magneto-optical type but entails rotating the disk at low speed and recording the ID through a "write once" method using a high-power laser light beam. Since special equipment is necessary in order to record on the film of a magneto-optical disk medium by the "write once" technique, an ordinary user is entirely incapable of rewriting the medium ID.

This embodiment will now be described taking a 3.5-inch magneto-optical disk as an example. In general, optical disk drives presently available on the market have a disk rotating speed of 2400~3600 rpm and a recording laser power of approximately 10 mW. The data area of a magneto-optical disk is capable of being rewritten, with data being recorded by a magneto-optical signal. A magneto-optical disk also has a ROM area in which information such as disk control information is recorded. The foregoing is for the case of a RAM disk, in which the entirety of the data area is rewritable. However, there are also disks in which all or part of the data area is a ROM area. (Such a disk is referred to as a full ROM disk or partial ROM disk.)

Prescribed information is recorded in a ROM area in the form of pits, and a general user cannot write data in the ROM area. Accordingly, consideration has been given to recording the medium ID in the ROM area in the same manner that information is recorded in this area. However, such an expedient is not realistic. Specifically, since information and the medium ID would be recorded in the ROM area in the form of pits by using a substrate-forming die referred to as a stamper, a stamper having a different ID would have to be prepared for each individual magneto-optical disk in order to make the medium ID different for each disk.

(f-2) Method of irreversibly recording medium ID

According to this embodiment of the invention, a magneto-optical disk having RAM and ROM portions is prepared and pits are formed in the ROM portion using a high-power laser while rotating the disk at a low speed. At this time the servo characteristics of the drive also are made to correspond to low-speed rotation. As for the method of pit formation, it is permissible to form holes completely through the recording film since the reading in of information from the ROM portion utilizes the intensity of reflected light. Further, if a pit signal is read in, it is unnecessary to form the holes completely through the recording film. In such case it is permissible to merely deform or alter the properties of the film.

Figure 22:
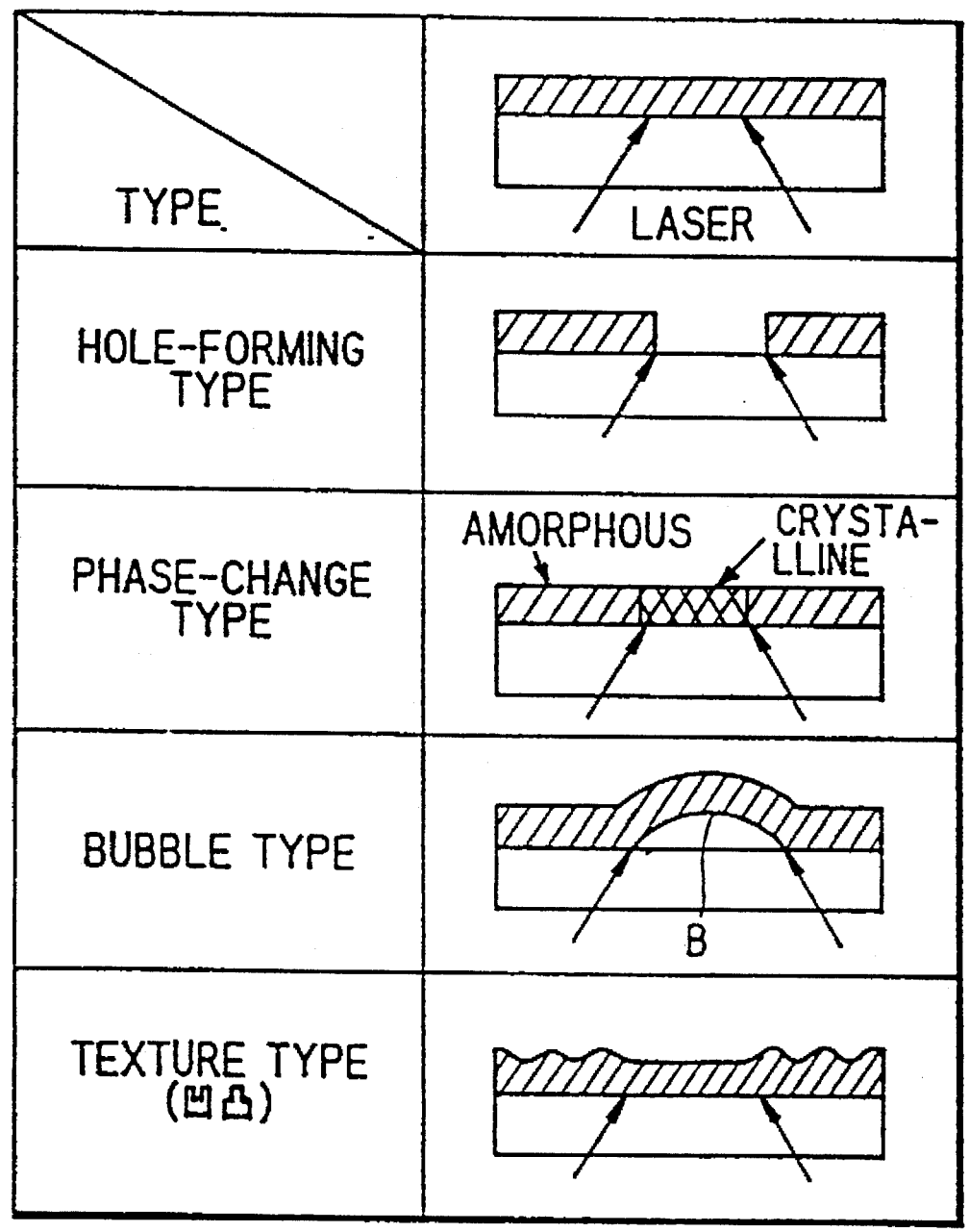
FIG. 22 is a diagram for describing a method of forming pits.

FIG. 22 is a diagram for describing the method of pit formation. Broadly speaking, four types of pit formation can be used: (1) a hole-forming type, (2) a phase-change type, (3) a bubble type and (4) a texture type.

In the hole-forming type, a recording film consisting of Te-C, Te-Se or the like formed on a transparent substrate is irradiated with a high-power laser light beam to raise the temperature of the recording layer above the melting point or decomposition point thereof, thereby forming holes. If the recording film is subsequently scanned with a weak laser light beam, reflected light does not return from the portions having the holes. Accordingly, signals can be reproduced from the recording film by detecting the intensity of reflected light using a photodiode.

In the phase-change type, $TeO_2$ and Te are deposited on a transparent substrate by binary simultaneous vapor deposition or the like to form an amorphous film (recording film) of $TeO_x$ (x=1.1~1.5), the amorphous film is irradiated with a laser beam to elevate the film to its crystallization temperature, and then the film is cooled gradually so as to change the laser-irradiated portions to the crystalline state. Since the amount of reflected laser light at crystalline portions differs from that at non-crystalline portions, data can be recorded only one time and this data can be read subsequently.

In the bubble type, a macromolecular trigger layer and a platinum (Pt) recording layer are formed successively on a transparent substrate, and a bubble B is formed by irradiation with a laser beam. The reflectivity of laser light varies depending upon the absence or presence of bubbles, thereby making it possible to reproduce signals from the recording layer at a later time.

In the texture type, first the recording layer is formed to have pits in advance and then the layer is irradiated with a laser beam to smoothen the surface thereof, thereby making the reflectivity of the surface before recording and the reflectivity of the surface after recording differ. As a result, signals can be reproduced subsequently.

It will suffice to prepare a 64-bit signal as the medium ID, and only one sector need be provided for the medium ID.

(f-3) Construction of fourth embodiment

FIG. 23 is a diagram for describing the fourth embodiment of the present invention.

Illustrated in FIG. 23 are the magneto-optical disk (original) 1, the user data area 11, a RAM area 11a, a ROM area 11b, a medium-ID recording sector 120 recorded in the ROM area in a physically irreversible manner, and an application program (whose program name is SAMPLE.TXT) composed of main software 131, a medium ID 132 of the original and a checking program 133 for preventing unlawful use. The checking program 133 includes an address 134 at which the medium ID is recorded.

(f-4) Control for preventing unlawful or unauthorized use in fourth aspect of the invention After the optical disk is loaded in the optical disk drive 21 (FIG. 4), "SAMPLE.TXT" is entered from the keyboard and the return key is pressed. As a result, the host system 31 acquires the application program SAMPLE.TXT in accordance with prescribed handshaking with the optical disk drive 21 and stores the program in the memory 31b. Next, the checking program 133 for preventing unauthorized use of the application program SAMPLE.TXT is started up so that processing for preventing unauthorized use is executed.

The medium ID (the medium ID of the original in case of the original or the medium ID of a copy disk in case of the copy disk) is read from the sector 120 designated by the medium-ID recording address 134. Next, a check is performed to determine whether the read medium ID agrees with the medium ID of the original included in the application program SAMPLE.TXT. If they agree, this means the optical disk that has been loaded in the optical disk drive is the original. Accordingly, the main software 131 is executed. If the two do not agree, however, this means that the optical disk is the copy disk and, hence, a warning or other message is displayed and operation is halted.

Thus, the medium ID of an optical disk can be made to differ for each individual optical disk. Moreover, the medium ID is recorded in the ROM area in a physically irreversible manner. As a result, even if a general user makes a copy of the disk using a personal computer or the like, the user cannot rewrite his or her own medium ID, thus making it possible to prevent unlawful use of software.

In the foregoing, the medium ID is recorded in the ROM area of the magneto-optical disk, though it is possible to record the medium ID in the RAM area instead. The operation involved in the RAM area is exactly the same as that for performing recording in the ROM area. In the case of the RAM area, however, a method of magnetically altering the properties of the RAM area is more effective than that for forming holes. The reason for this is the possibility that holes formed in the RAM area may be detected as errors.

An example of a method of magnetically producing a change in property involves using a high-power laser light beam to irradiate a non-crystalline material (an amorphous ferrous metal or the like) formed on a substrate, thereby elevating the crystallization temperature, and subsequently cooling the material to change the laser-irradiated portions to the crystalline state. Thus, the crystallized portions undergo a magnetic change in property that is irreversible.

In the case where the phase-change type or the bubble type is adopted for forming the pits, at the time when the medium ID is read, the regeneration mode for reading data from the optical disk is changed from the magneto-optical regeneration mode to the regeneration mode in conformity to the phase-change type or the bubble type. In this regeneration mode, the decrease or increase of the quantity of the reflected light is not regarded as an error and the medium ID is read by changing the quantity of light of a optical pick-up provided in a magneto-optical disk drive unit. Mode changing instruction information is recorded in a predetermined area of the optical disk in advance so that the magneto-optical disk drive unit changes the regeneration mode at the time of reading the medium ID. The structure of the magneto-optical disk drive unit is disclosed in Japanese laid-open patent No. Tokkaihei 5-242505.

Although, the original medium ID is contained in the application program, it is possible to record it anywhere in the optical disk. And when a plurality of application programs are recorded in the optical disk, it is possible to provide the original medium ID for each application program.

Thus, in accordance with the present invention, it is arranged to additionally provide software with the corresponding relationship between physical addresses storing software data on an original and logical addresses, and with a security program for preventing unlawful or unauthorized use, obtain an actual corresponding relationship between physical addresses and logical addresses on a storage medium on the basis of the security program when the software is executed, compare this corresponding relationship with the corresponding relationship added on to the software, allow execution of the software in a case where the result of the comparison indicates agreement and disallow execution of the software in a case where the result of the comparison indicates non-agreement. Accordingly, even if the software of the original is copied unlawfully, the software cannot be executed, thus rendering the copy meaningless. This prevents unauthorized copying of the software.

Further, in accordance with the invention, it is so arranged that in a case where software has been copied from an original in cluster units, the correspondence between the logical and physical addresses on the copy is different from the corresponding relationship on the original. Therefore, even if software is copied by a DOS command, the copied software cannot be executed and the unauthorized copying of software can be prevented.

Furthermore, it is so arranged that the relationship between the physical and logical addresses on an original will not become a simple rising or falling sequence. This means that even if the original is copied, the correspondence between the physical and logical addresses on the copy can be made different from the corresponding relationship on the original.

Further, in accordance with the present invention, the corresponding relationship between physical and logical addresses is managed in sector units, a prescribed normal sector on the original is regarded as being a defective sector and part of the software is recorded in a sector that is an alternate to the defective sector. (A physical address of the alternate sector is incorporated in the corresponding relationship of the original.) As a result, it is so arranged that in a case where software has been copied from the original in sector units, the data that has been recorded in the alternate sector is recorded in the normal sector of the copy and a physical address of the alternate sector is no longer incorporated in the corresponding relationship on the copy. As a result, the corresponding relationship on the copy becomes different from the corresponding relationship on the original. Even if copying is performed in sector units, execution of software can be prevented.

Furthermore, in accordance with the present invention, a medium ID is recorded in a prescribed normal sector on an original, software is additionally provided with the medium ID of the original and with a security program for preventing unlawful or unauthorized copying, and the normal sector in which the medium ID has been recorded is construed to be a defective sector in an ordinary mode. Consequently, in a case where software is read from the original and recorded on a copy, the data that has been recorded in the alternate sector is recorded in the normal sector of the copy, and the data in the prescribed normal sector of the copy differs from the medium ID of the original. As a result, when the software is executed, a maintenance mode is established by the security program, the data is read out of the normal sector and it is judged whether the data agrees with the original medium ID that has been added on to the software. If it is judged that the two agree, the ordinary mode is established and execution of the software is allowed. If the two do not agree, then execution of the software is not allowed. Therefore, even if the software is copied unlawfully from the original to another disk, the software cannot be executed and, hence, the copy is rendered meaningless. This makes it possible to prevent unlawful copying.

Further, in accordance with the invention, the medium ID of an optical disk can be made different for each individual disk. Moreover, the medium ID is recorded in a physically or magnetically irreversible manner. As a result, even if a general user makes a copy of the disk using a personal computer or the like, the user cannot rewrite his or her own medium ID so as to make it agree with the medium ID of the original. This makes it possible to prevent unlawful or unauthorized use of software.

As many apparently widely different embodiments of the present invention can be made without departing from the spirit and scope thereof, it is to be understood that the invention is not limited to the specific embodiments thereof except as defined in the appended claims.

What is claimed is:

1. A method of preventing unauthorized use in a system for reading software/data from physical addresses on a recording medium in accordance with logical addresses instructed by a controller comprising steps of:

reading relationship information between the physical addresses and the logical addresses on said recording medium for reading the software/data;

reading original relationship information between the physical addresses and the logical addresses, for reading from an original recording medium, from the recording medium;

comparing between the relationship information and the original relationship information;

identifying unauthorized use of the software/data based on a comparison between the relationship information and the original relationship information.

2. The method according to claim 1, further comprising steps of:

arranging the relationship information or the original relationship information so as to be able to compare with each other.

3. The method according to claim 1, said judging step comprising steps of:

allowing to read the software/data from the recording medium when the relationship information agree to the original relationship information; and disallowing to read the software/data from the recording medium when the relationship information disagrees to the original relationship information.

4. The method according to claim 1, further comprising a step of copying the software/data on an recording medium so that the relationship information for reading the software/data from the copied medium differs from the original relationship information of the original recording medium.

5. The method according to claim 1, the logical and physical addresses are correlated randomly in such a manner that the correspondence between the logical addresses and physical addresses in the original relationship will not become a simple rising or falling sequence.

6. The method according to claim 1, wherein the relationship information between said logical addresses and physical addresses on the recording medium is obtained from file management information that has been written in a file management area of the recording medium.

7. The method according to claim 1, wherein said logical addresses are assigned in cluster units.

8. The method according to claim 1, wherein said physical addresses are assigned in sector units, a prescribed sector of the recording medium is regarded as being a defective sector and part of the software is recorded in an alternate sector that corresponds to said defective sector to complicate the relationship on the original.

9. A recording medium comprising:

software/data storing area for storing software which are read from physical addresses on an recording medium in accordance with logical addresses instructed by a controller;

relationship information storing area for storing information of relationship between said physical addresses and said logical addresses for reading the software/data from the recording medium; and original relationship information storing area for storing original relationship information between the physical addresses and the logical addresses, for reading the software/data from an original recording medium and for identifying unauthorized use of the software/data based on a comparison between said relationship information and said original relationship information.

10. A method of preventing unauthorized use in a system wherein software is written in a recording medium at prescribed physical addresses thereof, the software is read out from these physical addresses in the order of logical addresses and the software is executed, said method comprising the steps of:

providing a table, which stores a corresponding relationship between the physical addresses and the logical addresses of the software, and a security program for preventing unauthorized use of the software;

obtaining a corresponding relationship between physical addresses on the recording medium, on which the software has been stored, and logical addresses by executing the security program before said software is executed;

comparing this corresponding relationship with the corresponding relationship in said table; and preventing unauthorized use of the software by disallowing execution of the software in a case where result of the comparison indicates that use of the software would be unauthorized.

11. The method according to claim 10, wherein when the software has been copied, it is so arranged that correspondence between logical addresses and physical addresses on the copy will differ from the corresponding relationship on the original.

12. The method according to claim 10, wherein the logical and physical addresses are correlated randomly in such a manner that the correspondence between the logical addresses and physical addresses in the corresponding relationship of the original will not become a simple rising or falling sequence.

13. The method according to claim 10, wherein the corresponding relationship between said logical addresses and physical addresses on the recording medium is obtained from file management information that has been written in a file management area of the recording medium.

14. The method according to claim 10, wherein said addresses are assigned in cluster units.

15. The method according to claim 10, wherein said addresses are assigned in sector units, a prescribed sector of the recording medium is regarded as being a defective sector and part of the software is recorded in an alternate sector that corresponds to said defective sector to complicate the corresponding relationship on the original.

* * * * *

UNITED STATES PATENT AND TRADEMARK OFFICE
CERTIFICATE OF CORRECTION

PATENT NO. : 5,661,800
DATED : August 26, 1997
INVENTOR(S) : Nakashima et al.

It is certified that error appears in the above-identified patent and that said Letters Patent is hereby corrected as shown below:

Column 1, line 31, delete "such-as" and insert --such as-- therefor.

Column 1, line 54, delete "unlawful".

Column 1, line 64, after "or" insert --unlawful--.

Column 1, line 67, delete "steps" and insert --the step-- therefor.

Column 4, line 62, delete "Standard." and insert --Standard-- therefor.

UNITED STATES PATENT AND TRADEMARK OFFICE
CERTIFICATE OF CORRECTION

PATENT NO. : 5,661,800
DATED : August 26, 1997
INVENTOR(S) : Nakashima et al.

It is certified that error appears in the above-identified patent and that said Letters Patent is hereby corrected as shown below:

Column 7, lin 10, delete "will, suffice" and insert --will suffice-- therefor.

Column 8, line 37, after "unlawful" insert --or--.

Column 8, line 47, delete "cab" and insert --can-- therefor.

Column 13, line 1, delete "I" and insert --1-- therefor.

Column 13, line 13, delete "processed" and insert --accessed-- therefor.

UNITED STATES PATENT AND TRADEMARK OFFICE
CERTIFICATE OF CORRECTION

PATENT NO. : 5,661,800
DATED : August 26, 1997
INVENTOR(S) : Nakashima et al.

It is certified that error appears in the above-identified patent and that said Letters Patent is hereby corrected as shown below:

Column 16, line 15, delete "relationship:between" and insert --relationship between-- therefor.

Column 17, line 56, delete "judging" and insert --identifying-- therefor.

Column 18, line 4, before "the" insert --wherein--.

UNITED STATES PATENT AND TRADEMARK OFFICE
CERTIFICATE OF CORRECTION

PATENT NO. : 5,661,800
DATED     : August 26, 1997
INVENTOR(S) : Nakashima et al.

It is certified that error appears in the above-identified patent and that said Letters Patent is hereby corrected as shown below:

Column 18, line 25, between "A" and "recording" insert --machine readable--.

Column 18, line 27, delete "an" and insert --the-- therefor.

Signed and Sealed this

First Day of September, 1998

Attest:

BRUCE LEHMAN

*Attesting Officer*  *Commissioner of Patents and Trademarks*